United States Patent
Kangas et al.

(10) Patent No.: US 10,697,830 B1
(45) Date of Patent: Jun. 30, 2020

(54) MULTICOMB LIGHT SOURCE AND SPECTROMETER

(71) Applicants: Miikka M. Kangas, Sunnyvale, CA (US); Jeffrey G. Koller, Cupertino, CA (US); William C. Athas, Cupertino, CA (US)

(72) Inventors: Miikka M. Kangas, Sunnyvale, CA (US); Jeffrey G. Koller, Cupertino, CA (US); William C. Athas, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/690,145

(22) Filed: Aug. 29, 2017

Related U.S. Application Data

(60) Provisional application No. 62/381,905, filed on Aug. 31, 2016.

(51) Int. Cl.
*G01J 3/10* (2006.01)
*G01J 3/51* (2006.01)
(Continued)

(52) U.S. Cl.
CPC ............... *G01J 3/10* (2013.01); *G01J 3/0218* (2013.01); *G01J 3/42* (2013.01); *G01J 3/51* (2013.01); *G01J 2003/102* (2013.01)

(58) Field of Classification Search
CPC .............. G01J 2003/102; G01J 2003/104
See application file for complete search history.

(56) References Cited

U.S. PATENT DOCUMENTS

| 4,227,091 A | 10/1980 | Sick |
| 4,880,304 A | 11/1989 | Jaeb |

(Continued)

FOREIGN PATENT DOCUMENTS

| EP | 2 992 821 A1 | 3/2016 |
| JP | 2000-163031 A | 6/2000 |

(Continued)

OTHER PUBLICATIONS

International Search Report dated Aug. 9, 2017, for PCT Application No. PCT/US2017/032028, filed May 10, 2017, four pages.
(Continued)

*Primary Examiner* — Shawn Decenzo
(74) *Attorney, Agent, or Firm* — Brownstein Hyatt Farber Schreck, LLP

(57) ABSTRACT

A comb light source and spectrometer is disclosed. The comb light source and spectrometer can include a plurality of light emitters, where each light emitter can be configured to emit light included in a plurality of wavelength bands. Each wavelength band can be separated from an adjacent wavelength band by a noise band. Due to the separated wavelength bands for a light emitter, any signal received outside of the one or more wavelength bands can originate from noise (e.g., drift, ambient light, electrical noise), thereby enhancing signal analysis and noise rejection. In some examples, the comb light emitters can be activated sequentially such that a plurality of wavelengths across a spectrum can be measured. In some examples, the resolution and the number of spectral lines in the comb light source can be tuned by changing the properties of the quantum dots and/or increasing the number of comb light emitters.

19 Claims, 22 Drawing Sheets

(51) Int. Cl.
*G01J 3/02* (2006.01)
*G01J 3/42* (2006.01)

(56) References Cited

U.S. PATENT DOCUMENTS

| | | | |
|---|---|---|---|
| 5,483,261 A | 1/1996 | Yasutake |
| 5,488,204 A | 1/1996 | Mead et al. |
| 5,695,520 A | 12/1997 | Bruckner et al. |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,263,222 B1 | 7/2001 | Diab |
| 6,310,610 B1 | 10/2001 | Beaton et al. |
| 6,323,846 B1 | 11/2001 | Westerman et al. |
| 6,341,116 B1 | 1/2002 | Lee |
| 6,475,153 B1 | 11/2002 | Khair et al. |
| 6,558,335 B1 | 5/2003 | Thede |
| 6,605,045 B2 | 8/2003 | Ohsaki et al. |
| 6,690,387 B2 | 2/2004 | Zimmerman et al. |
| 6,699,199 B2 | 3/2004 | Asada et al. |
| 7,015,894 B2 | 3/2006 | Morohoshi |
| 7,184,064 B2 | 2/2007 | Zimmerman et al. |
| 7,616,110 B2 | 11/2009 | Crump et al. |
| 7,663,607 B2 | 2/2010 | Hotelling et al. |
| 7,738,935 B1 | 6/2010 | Turcott |
| 8,279,441 B2 * | 10/2012 | Brown .................. G01J 3/02 356/402 |
| 8,378,811 B2 | 2/2013 | Crump et al. |
| 8,437,825 B2 | 5/2013 | Dalvi et al. |
| 8,442,608 B2 | 5/2013 | Pav |
| 8,479,122 B2 | 7/2013 | Hotelling et al. |
| 8,618,930 B2 | 12/2013 | Papadopoulos et al. |
| 8,649,839 B2 | 2/2014 | Chin |
| 8,781,548 B2 | 7/2014 | Besko et al. |
| 8,954,135 B2 | 2/2015 | Yuen et al. |
| 9,804,027 B2 * | 10/2017 | Fish .................. G01J 3/1895 |
| 9,883,824 B2 | 2/2018 | Tiao |
| 10,060,788 B2 | 8/2018 | Fei |
| 10,098,555 B2 | 10/2018 | Yamaji |
| 10,433,739 B2 | 10/2019 | Weekly et al. |
| 2002/0097400 A1 * | 7/2002 | Jung .................. A61B 5/0075 356/419 |
| 2004/0255318 A1 | 12/2004 | Braitberg et al. |
| 2006/0197753 A1 | 9/2006 | Hotelling |
| 2008/0013887 A1 * | 1/2008 | Sappey .................. G01J 3/02 385/52 |
| 2008/0208020 A1 | 8/2008 | Cinbis et al. |
| 2010/0317943 A1 | 12/2010 | Kuhn et al. |
| 2013/0292571 A1 * | 11/2013 | Mukherjee .............. G01J 3/108 250/339.11 |
| 2014/0049155 A1 * | 2/2014 | Kurtin .................. H01L 33/502 313/512 |
| 2014/0155705 A1 | 6/2014 | Papadopoulos et al. |
| 2015/0190063 A1 | 7/2015 | Zakharov et al. |
| 2015/0335232 A1 * | 11/2015 | Ito .................. G02B 23/26 362/13 |
| 2016/0058312 A1 | 3/2016 | Han et al. |
| 2016/0183813 A1 | 6/2016 | Naima |
| 2016/0184019 A1 * | 6/2016 | Griffin .................. A61B 18/20 606/3 |
| 2016/0252458 A1 * | 9/2016 | Yu .................. G01N 21/031 250/459.1 |
| 2016/0296173 A1 | 10/2016 | Culbert |
| 2017/0005241 A1 * | 1/2017 | Lotito .................. B82B 1/00 |
| 2017/0045450 A1 * | 2/2017 | Lieber .................. G01N 21/645 |
| 2017/0249445 A1 | 8/2017 | Devries et al. |
| 2017/0325698 A1 | 11/2017 | Allec et al. |
| 2017/0325744 A1 | 11/2017 | Allec et al. |
| 2018/0138359 A1 * | 5/2018 | Ulmer .................. H01L 33/502 |
| 2018/0242892 A1 | 8/2018 | Schie |

FOREIGN PATENT DOCUMENTS

| | | |
|---|---|---|
| JP | 2002-342033 A | 11/2002 |
| WO | WO-2017/197033 A1 | 11/2017 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

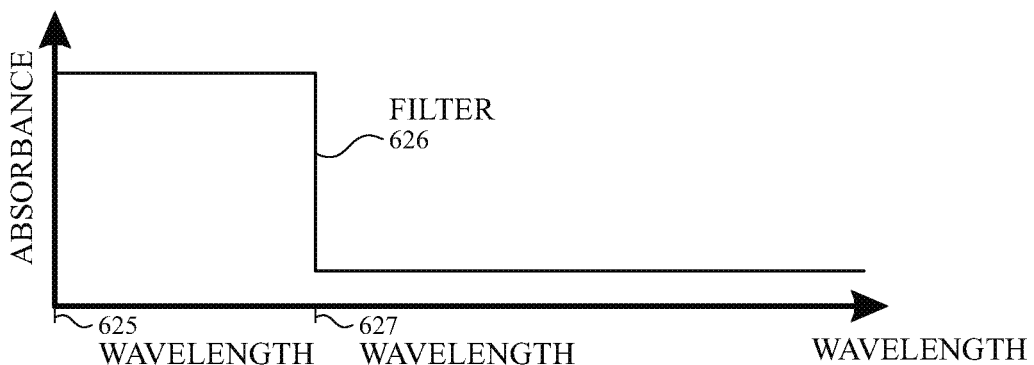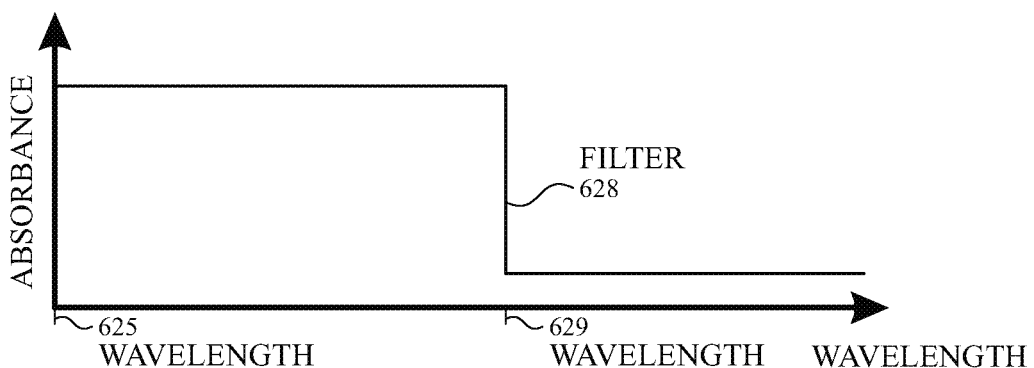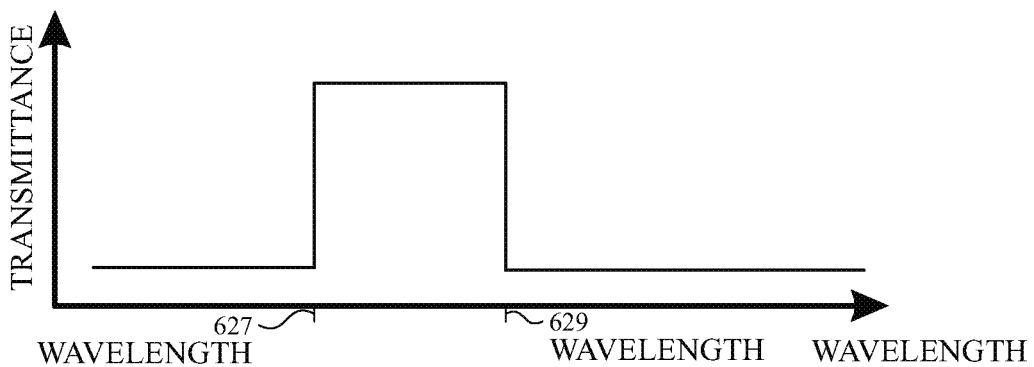
*FIG. 6C*

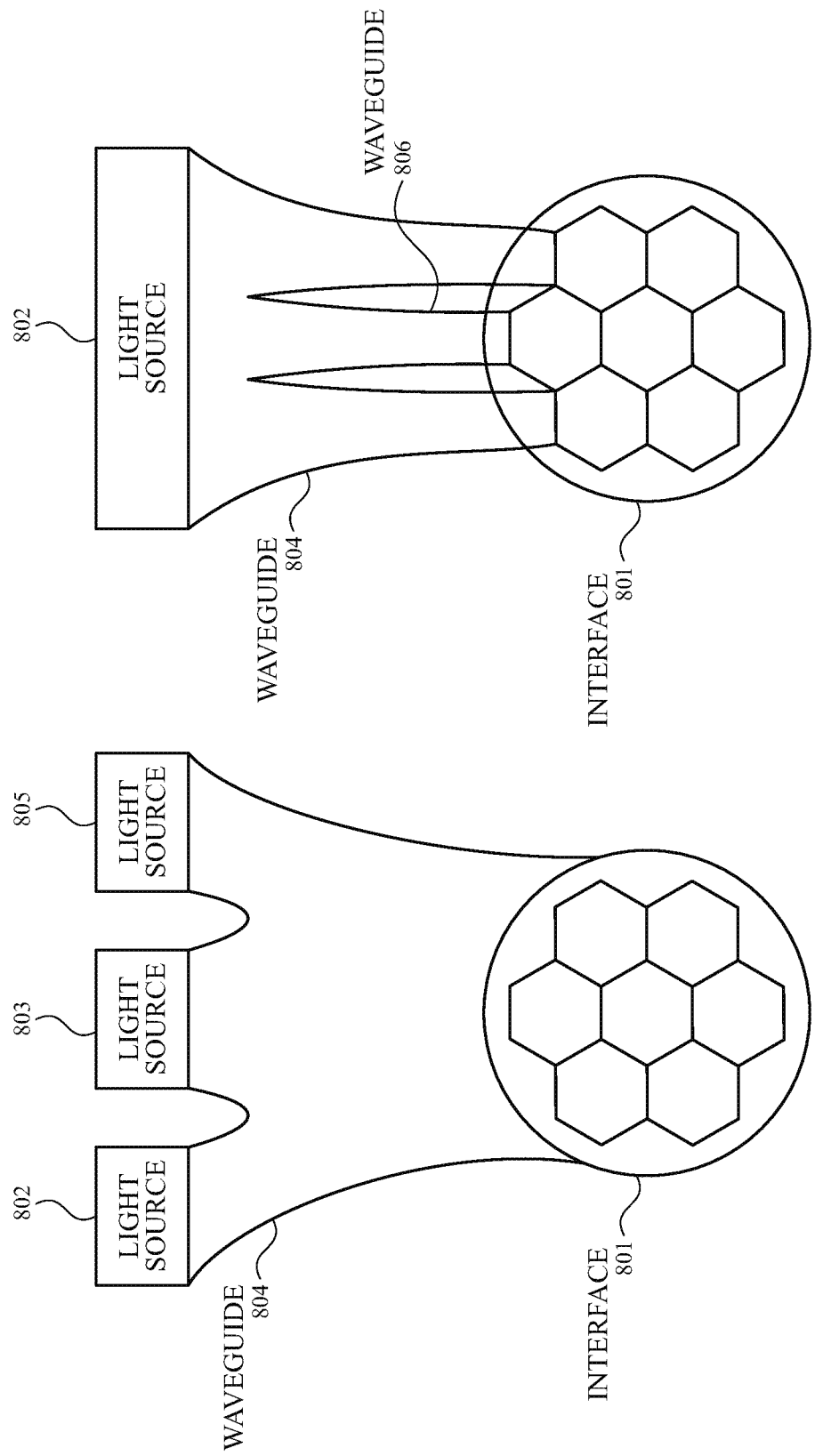

MULTICOMB LIGHT SOURCE AND SPECTROMETER

CROSS-REFERENCE TO RELATED APPLICATIONS

This application claims the benefit of U.S. Provisional Patent Application No. 62/381,905 filed Aug. 31, 2016, the entire disclosure of which is herein incorporated by reference for all purposes.

FIELD

This relates generally to light sources and spectrometer systems, and more specifically to a comb light source and spectrometer capable of emitting a spectrum of wavelengths.

BACKGROUND

Fourier transform spectroscopy and broadband light sources can be used for measuring sample properties at a spectrum of wavelengths. The Fourier transform spectroscopy can include a moving mirror that can create a path length difference in one light beam relative to another. The two light beams can recombine, and the resultant interferogram can be formed based on interference. The Fourier transform of the interferogram can be used to determine the spectral absorbance (or transmittance).

Although a broadband light source (e.g., white light) spectrometer may be capable of measuring across a spectrum of wavelengths, a broadband source may not be able or may require complicated algorithms to discern between signals associated with one or more sample properties and noise. Furthermore, broadband source spectrometers may use temporal multiplexing, which can lead to long measurement times, moving parts, and/or a large number of light sources. Moreover, broadband spectrometers may use spatial multiplexing, which may lead to a large number of optical components and/or mechanically moving parts. Additionally, broadband source spectrometers may not be capable of resolving specific wavelengths. A spectrometer and light source capable of measuring across a spectrum of wavelengths and capable of discerning between signal associated with one or more sample properties and noise may be desired.

SUMMARY

This relates to a comb light source and spectrometer. The comb light source and spectrometer can include a plurality of light emitters, where each light emitter can be configured to emit light included in a plurality of wavelength bands. Each wavelength band can be separated from an adjacent wavelength band by a noise band. Due to the separated wavelength bands for a light emitter, any signal received outside of the one or more wavelength bands can originate from noise (e.g., drift, ambient light, electrical noise), thereby enhancing signal analysis and noise rejection. In some examples, the comb light emitters can be activated sequentially such that a plurality of wavelengths across a spectrum can be measured. In some examples, the resolution and the number of spectral lines in the comb light source can be tuned by changing the properties of the quantum dots and/or increasing the number of comb light emitters.

BRIEF DESCRIPTION OF THE DRAWINGS

FIG. 6C illustrates exemplary spectral absorbance for QD step filters and the calculated transmittance according to examples of the disclosure.

FIGS. 8A-8B illustrate exemplary waveguide configurations according to examples of the disclosure.

DETAILED DESCRIPTION

Figure 1A:
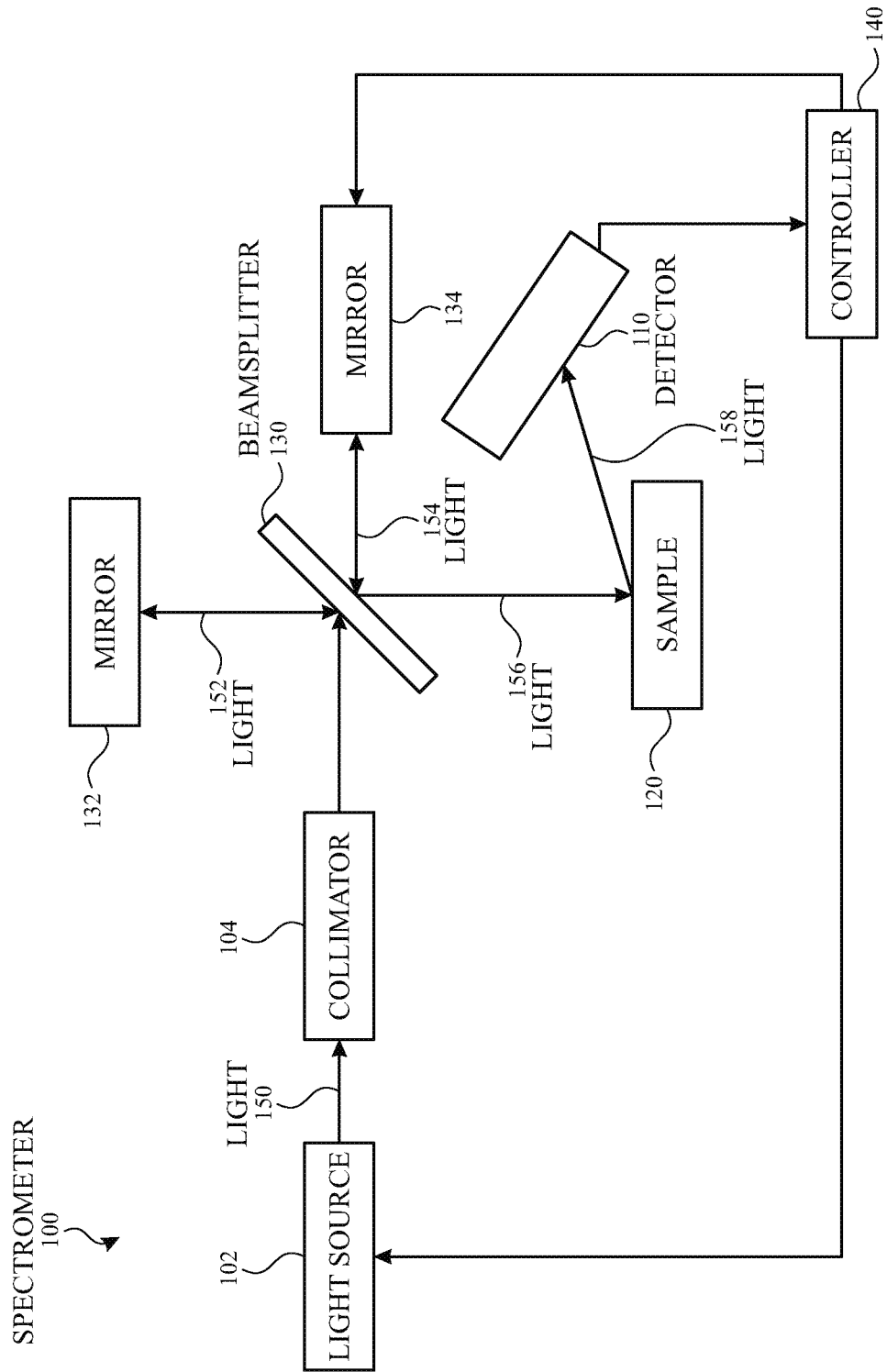
FIG. 1A illustrates an exemplary Fourier transform spectrometer according to examples of the disclosure.

In the following description of examples, reference is made to the accompanying drawings in which it is shown by way of illustration specific examples that can be practiced. It is to be understood that other examples can be used and structural changes can be made without departing from the scope of the various examples.

Representative applications of methods and apparatus according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

Various techniques and process flow steps will be described in detail with reference to examples as illustrated in the accompanying drawings. In the following description, numerous specific details are set forth in order to provide a thorough understanding of one or more aspects and/or features described or referenced herein. It will be apparent, however, to one skilled in the art, that one or more aspects and/or features described or referenced herein may be practiced without some or all of these specific details. In other instances, well-known process steps and/or structures have not been described in detail in order to not obscure some of the aspects and/or features described or referenced herein.

Further, although process steps or method steps can be described in a sequential order, such processes and methods can be configured to work in any suitable order. In other words, any sequence or order of steps that can be described in the disclosure does not, in and of itself, indicate a requirement that the steps be performed in that order. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modification thereto, does not imply that the illustrated process or any of its steps are necessary to one or more of the examples, and does not imply that the illustrated process is preferred.

This disclosure relates to a comb light source and spectrometer. The comb light source and spectrometer can include a plurality of light emitters, where each light emitter can be configured to emit light included in a plurality of wavelength bands (e.g., a plurality of continuous wavelengths). Each wavelength band can be separated from an adjacent wavelength band by a noise band. Due to the separated wavelength bands for each comb light emitter, any light measured outside of the wavelength bands can originate from noise (e.g., drift, ambient light, and/or electrical noise). Signal analysis and noise rejection can be enhanced by limiting the emission wavelengths of a comb light emitter to the one or more wavelength bands. In some examples, the comb light emitters can be activated sequentially such that a plurality of wavelengths across a spectrum can be measured. In some examples, the resolution and the number of spectral lines in the comb light source can be tuned by changing the properties of the quantum dots and/or increasing the number of comb light sources.

Figure 1B:
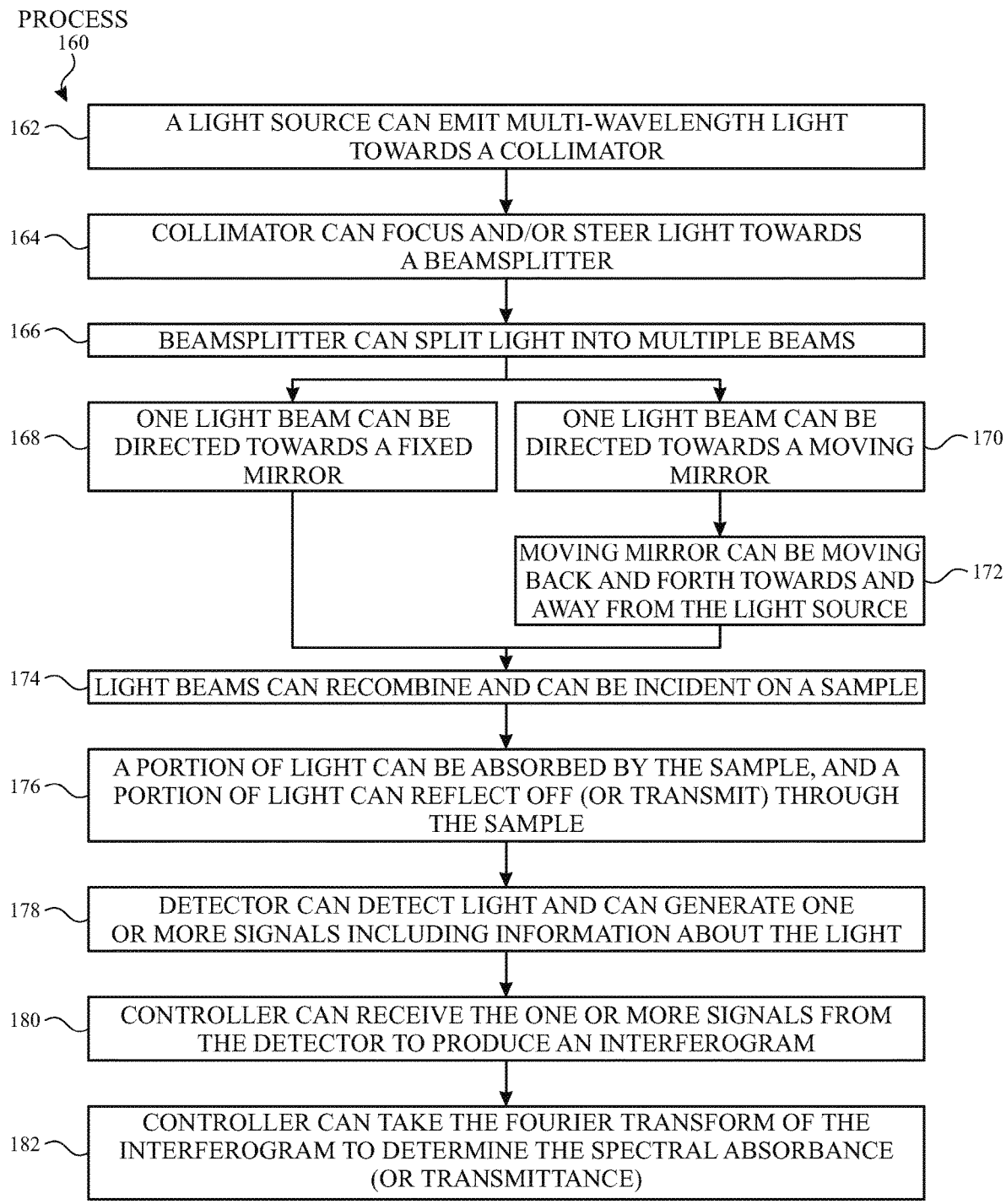
FIG. 1B illustrates an exemplary method for operating the Fourier transform spectrometer according to examples of the disclosure.

FIG. 1A illustrates an exemplary Fourier transform spectrometer, and FIG. 1B illustrates an exemplary method for operating the Fourier transform spectrometer according to examples of the disclosure. Spectrometer 100 can include light source 102, collimator 104, detector 110, sample 120, beamsplitter 130, mirror 132, mirror 134, and controller 140.

Light source 102 can emit multi-band or multi-wavelength light 150 towards collimator 104 (step 162 of process 160). Collimator 104 can be a component configured to focus and/or steer light (step 164 of process 160). Light 150 can be incident on beamsplitter 130. Beamsplitter 130 can be any optical component configured to split a beam of light into multiple beams of light. For example, beamsplitter 130 can split light 150 into to multiple light beams: light 152 and light 154 (step 166 of process 160).

Light 152 can be directed towards mirror 132 (step 168 of process 160). Mirror 132 can be any type of optics capable of reflecting light towards sample 120. In some examples, mirror 132 can be a stationary or fixed mirror. Light 154 can be directed towards mirror 134 (step 170 of process 160). Mirror 134 can be any type of optics capable of reflecting light towards beamsplitter 130. In some examples, mirror 134 can be a moveable mirror. In some examples, mirror 134 can be configured for moving back and forth (e.g., longitudinal movement along a line) towards and away from light source 102 (step 172 of process 160).

Mirror 132 and mirror 134 can be configured such that the path length of light 152 can be different from the path length of light 154. For example, mirror 134 can be located further away from sample 120 than mirror 132, which can create a longer path length for light 154 than light 152. In some examples, the path length of light 154 can change by way of movement of mirror 134 at a constant velocity. The difference in intensity of light 152 and light 154 can be a function of the difference of the path lengths. Light 152 and light 154 can recombine, to form light 156, and can be incident on sample 120 (step 174 of process 160). A portion of light 156 can be absorbed by sample 120, and a portion of light 156 can reflect off (or transmit) sample 120 (step 176 of process 170) as light 158. Detector 110 can detect light 158 and can generate one or more signals including information about light 158 (step 178 of process 170). A processor or controller 140 can receive the one or more signals from detector 110 (step 180 of process 170). Controller 140 can capture signals (e.g., output waveforms) at one or more wavelengths to produce an interferogram. Controller 140 can take the Fourier Transform of the interferogram to determine the spectral absorbance (or transmittance) (step 182 of process 170).

Figure 1C:
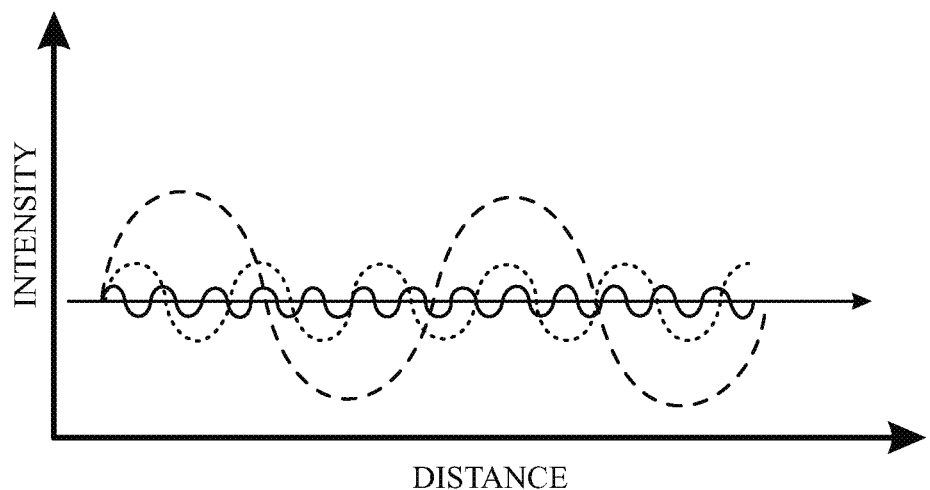
FIG. 1C illustrates an exemplary Fourier transform output according to examples of the disclosure.

FIG. 1C illustrates an exemplary Fourier transform output according to examples of the disclosure. In some examples, mirror 132 and mirror 134 can be equidistant from beamsplitter 130, and light 152 and light 154 can have the same path length. Light 152 and light 154 can have the same phase as each other and can interfere constructively to form light 158. On the other hand, for example, if mirror 134 is located a quarter-wavelength of light 150 from beamsplitter 130, light 152 and light 154 can be completely out of phase with each other and can interfere destructively to form light 158. In some examples, mirror 134 can move back and forth, causing light 158 to include partial constructive interference, partial destructive interference, total constructive interference, and total destructive interference. The resultant output can be a wave with full intensity (e.g., when both mirror 132 and mirror 134 are equidistant) to zero intensity (e.g., when mirror 134 is located a quarter-wavelength of light 150).

Figure 2A:
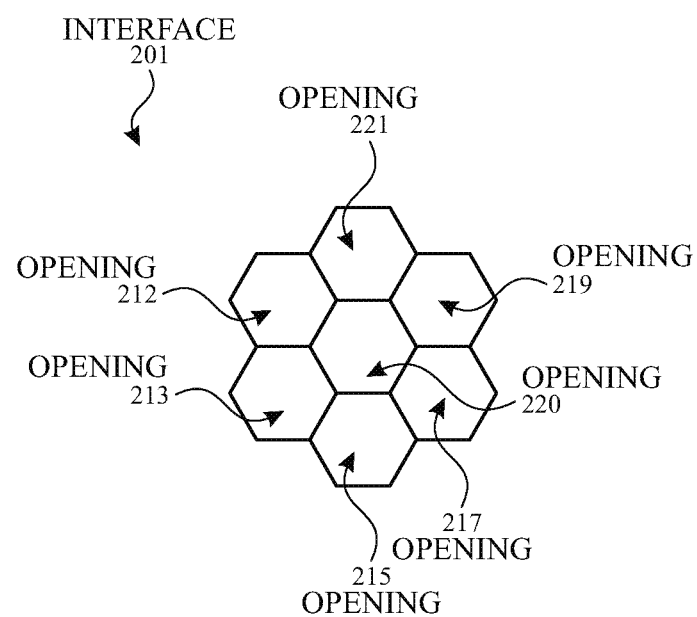
FIG. 2A illustrates an interface included in a comb spectrometer according to examples of the disclosure.

FIG. 2A illustrates an interface included in a comb spectrometer according to examples of the disclosure. Interface 201 can include opening 212, opening 213, opening 215, opening 217, opening 219, opening 220, and opening 221. The one or more openings can include one or more apertures, openings, and/or windows configured to allow light to pass through. Each opening can be optically coupled to one or more optical components, such as a light source and/or a detector.

One or more openings of interface 201 can be coupled to a light source. For example, the outer openings (e.g., opening 212, opening 213, opening 215, opening 217, opening 219, and opening 221) can each be coupled to a light source. In some examples, each light source can be coupled to a different opening than another light source. One or more openings, such as opening 220, can be coupled to a detector.

Figure 2B:
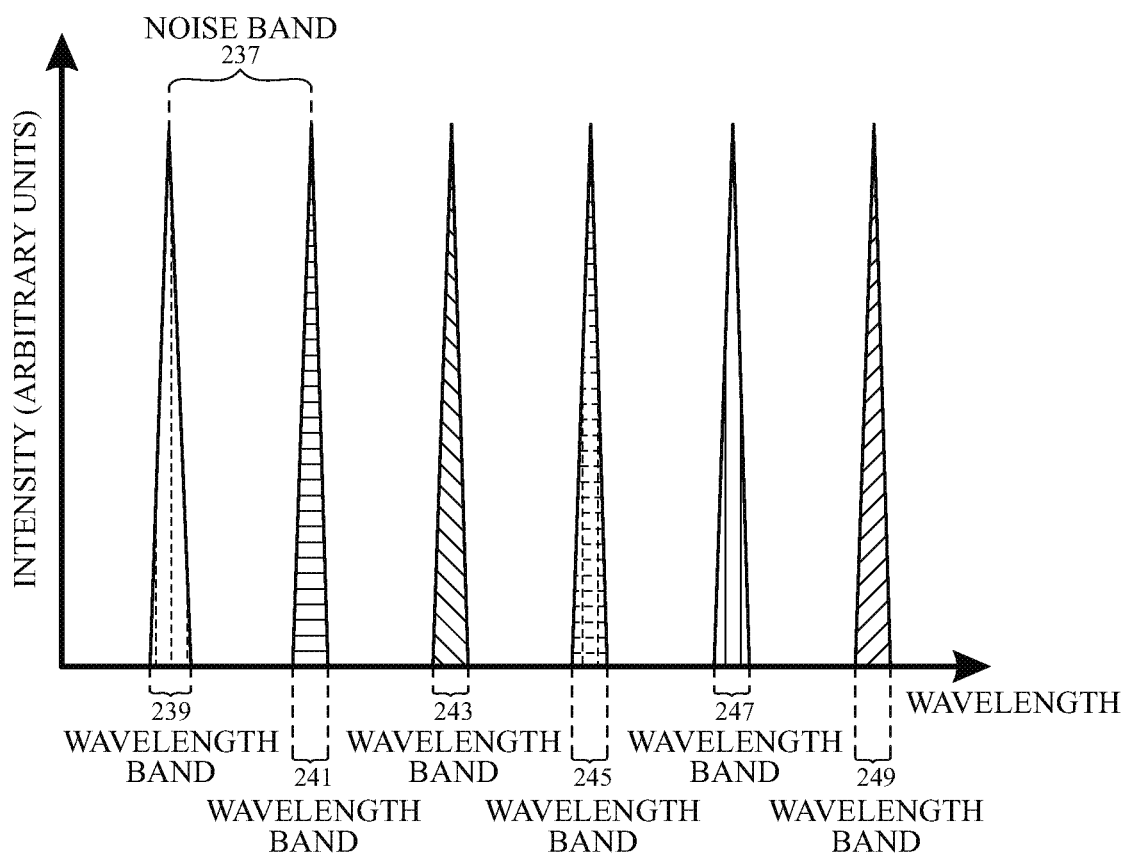
FIG. 2B illustrates an exemplary comb output according to examples of the disclosure.

FIG. 2B illustrates an exemplary comb output according to examples of the disclosure. The comb light emitter (e.g., a light emitter coupled to opening 212) can be any type of optical component capable of emitting light in a plurality of wavelength bands, where each wavelength band can be quantized and discrete (i.e., separated by one or more wavelengths). For example, the comb light emitter can include wavelength band 239 and wavelength band 241, where wavelength band 239 and wavelength band 241 can be separated by one or more wavelengths (included in noise band 237). In some examples, the comb light emitter can include a plurality of quantum dots (QDs) that can form the spectral quantized outputs, as illustrated in FIG. 2B. In some examples, each wavelength band can include one or more wavelengths different from the other wavelength bands. For example, wavelength band 247 can include 610-760 nm, whereas wavelength band 243 can include 500-570 nm.

The plurality of tuned QDs, in the aggregate, can be configured to emit light in the plurality of wavelength bands. For example, the plurality of wavelength bands can include wavelength band 239, wavelength band 241, wavelength band 243, wavelength band 245, wavelength band 247, and wavelength band 249, which can formed by six tuned QDs. In some examples, each QD can emit light in a unique wavelength band. A first QD can be tuned to emit light in wavelength band 239 (e.g., 405-445 nm). A second QD can be tuned to emit light in wavelength band 241 (e.g., 455-485 nm). A third QD can be tuned to emit light in wavelength band 243 (e.g., 495-555 nm). A fourth QD can be tuned to emit light in wavelength band 245 (e.g., 565-585 nm). A fifth QD can be tuned to emit wavelength band 247 (e.g., 595-630 nm). A sixth QD can be tuned to emit wavelength band 249 (e.g., 640-695 nm).

Each wavelength band can be separated from an adjacent wavelength band by a noise band. For example, noise band 237 can include one or more wavelengths between the range limits of wavelength band 239 and wavelength band 241. The separation of wavelength bands by a noise band can simplify the implementation and analysis of the spectrometer compared to a broadband source (e.g., white light source or globar). In some examples, given that noise may exist in noise band 237 where actual signal may not exist, noise can be eliminated or reduced from the signal without any use of filters or extra processing. In some examples, one or more wavelength bands, one or more noise bands, or both can have a 10 nm bandpass. In some examples, one or more wavelength bands, one or more noise bands, or both can have a 15 nm bandpass.

Figure 3A:
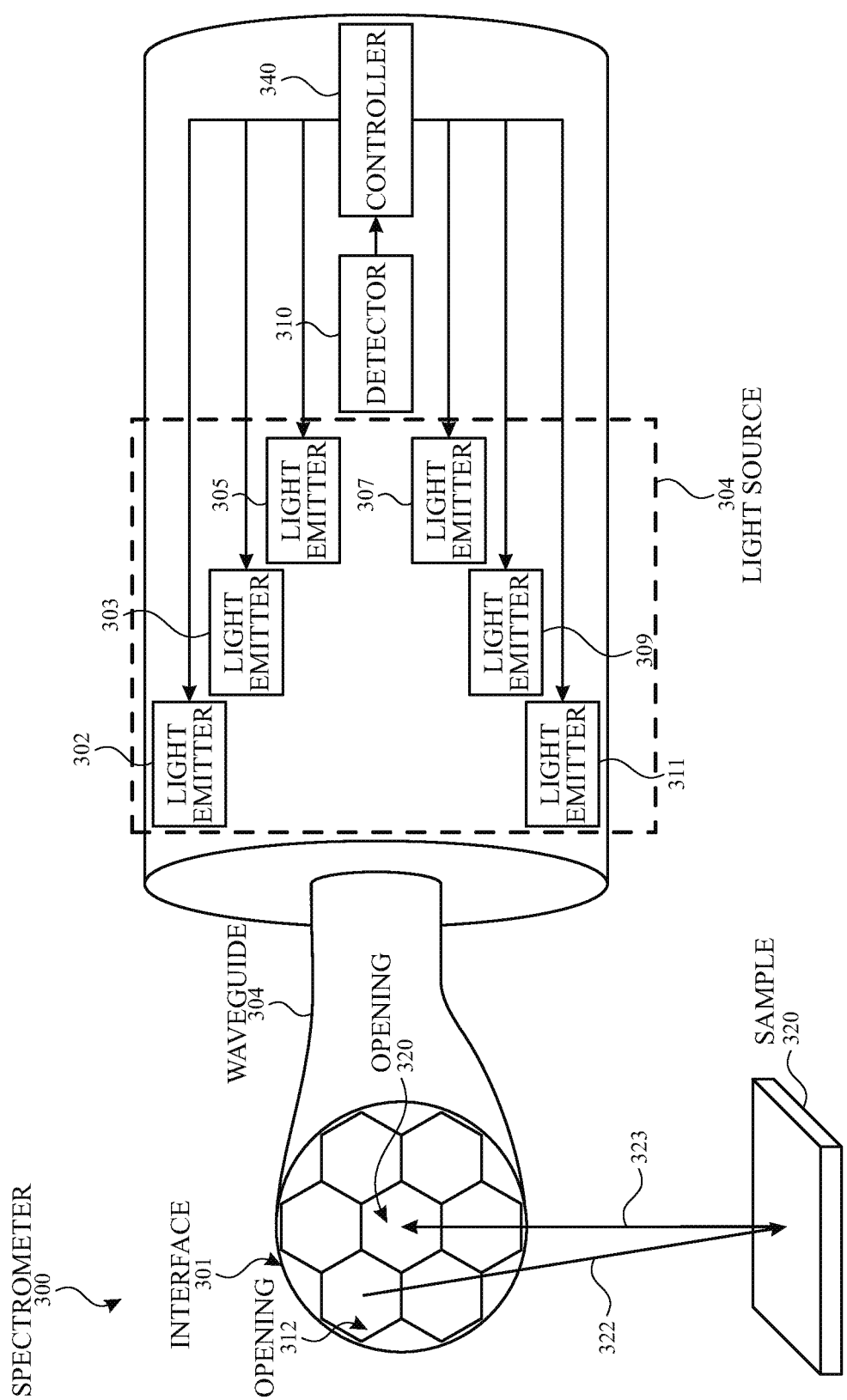
FIG. 3A illustrates an exemplary comb spectrometer according to examples of the disclosure.

FIG. 3A illustrates an exemplary comb spectrometer according to examples of the disclosure. Spectrometer 300 can include interface 301, light source 304, detector 310, and controller 340. Light source 304 can include light emitter 302, light emitter 303, light emitter 305, light emitter 307, light emitter 309, and light emitter 311. In some examples, the outer openings of interface 301 can be coupled to one or more light emitters. For example, opening 312 can be coupled to light emitter 302; opening 313 can be coupled to light emitter 303; opening 315 can be coupled to light emitter 305; opening 317 can be coupled to light emitter 307; opening 319 can be coupled to light emitter 309; and opening 321 can be coupled to light emitter 311. In some examples, the inner opening(s) of interface 301 can be coupled to one or more detectors. For example, opening 320 can be coupled to detector 310.

Interface 301 can be coupled to the optical components by one or more waveguides, such as waveguide 304. Waveguide 304 can be any type of optical component capable of transmitting light. In some examples, waveguide 304 can include one or more optical fibers. In some examples, waveguide 304 can include one or more silicon photonics chips.

Figure 3B:
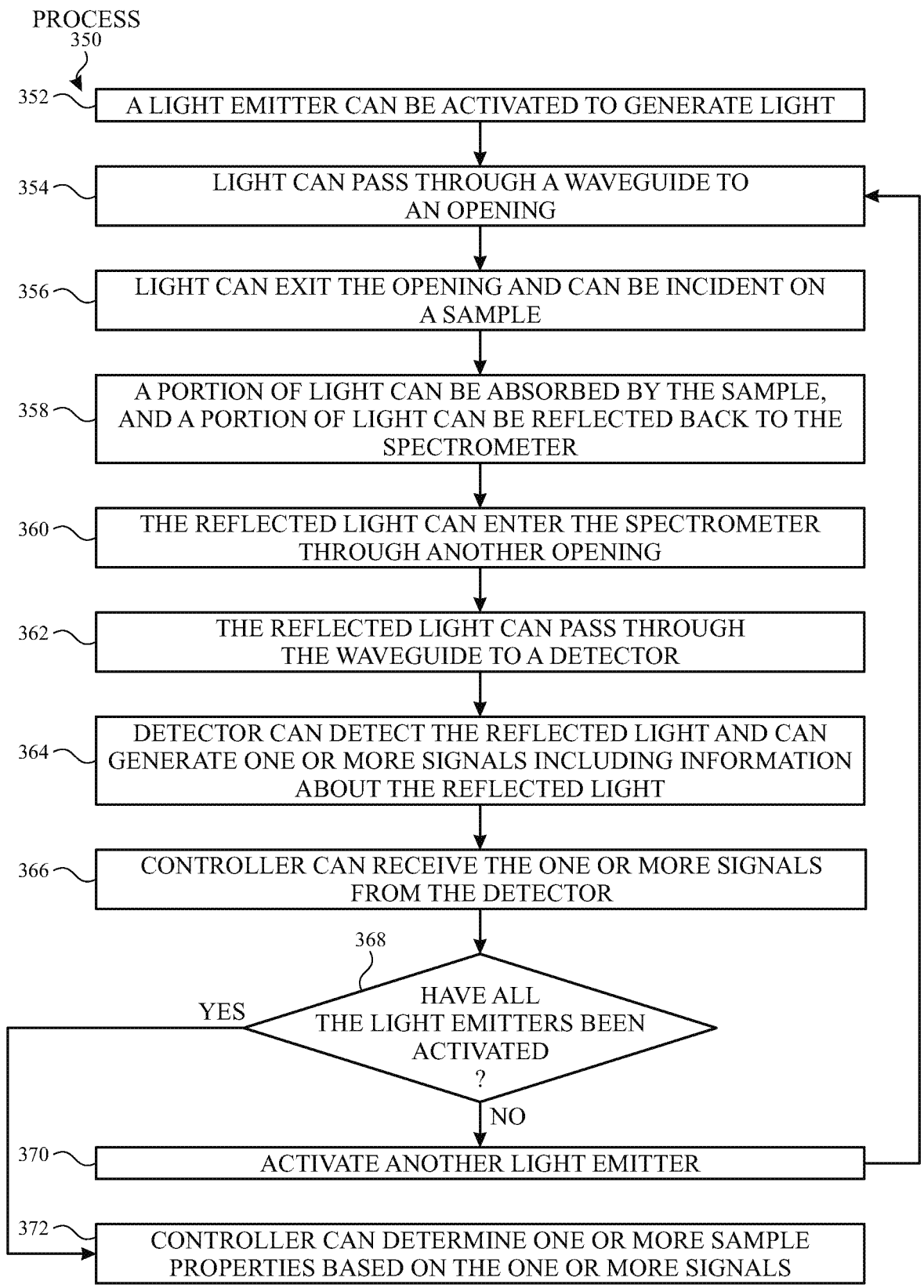
FIG. 3B illustrates an exemplary method for operating a comb spectrometer according to examples of the disclosure.

FIG. 3B illustrates an exemplary method for operating a comb spectrometer according to examples of the disclosure. Spectrometer 300 can be configured such that the comb light emitters are sequentially activated. A light emitter (e.g., light emitter 302 illustrated in FIG. 3A) included in a light source (e.g., light source 304 illustrated in FIG. 3A) can be activated to generate a first light (e.g., light 322 illustrated in FIG. 3A) (step 352 of process 350). In some examples, the first light can be lock-in modulated to eliminate or reduce the inclusion of noise or stray light in the measurement. In some examples, the first light can be lock-in modulated at 60 Hz. The first light can pass through a waveguide (e.g., waveguide 304) to a first opening (e.g., opening 312) (step 354 of process 350). The first light can exit the first opening (e.g., opening 312) (and/or spectrometer 300) and can be incident on a sample (e.g., sample 320) (step 356 of process 350). A portion of light can be absorbed by the sample, and a portion of light (e.g., light 323) can reflect back to the spectrometer (e.g., spectrometer 300) (step 358 of process 350). The reflected light (e.g., light 323) can enter the spectrometer through another opening (e.g., opening 320) (step 360 of process 350). The reflected light can pass through the waveguide to a detector (e.g., detector 310) (step 362 of process 350). The detector can detect the reflected light and can generate one or more signals including information about the reflected light (step 364 of process 350). A processor or controller (e.g., controller 340) can receive the one or more signals from the detector (e.g., detector 310) (step 366 of process 350). The process can be repeated until all or some of the plurality of light emitters has been activated (step 368 of process 350). The spectrometer can deactivate a light emitter (e.g., light emitter 302) included in the light source (e.g., light source 304) and can activate another light emitter (e.g., light emitter 303) while detecting the reflected light (step 370 of process 350). In some examples, each light emitter included in a light source can be sequentially activated, where the detector can generate signals for each activated light emitter. In some examples, light from the different comb light emitters can be lock-in modulated independently. The controller (e.g., controller 340) can determine one or more sample properties (e.g., sample 320) based on the one or more signals (step 372 of process 350).

Figure 3C:
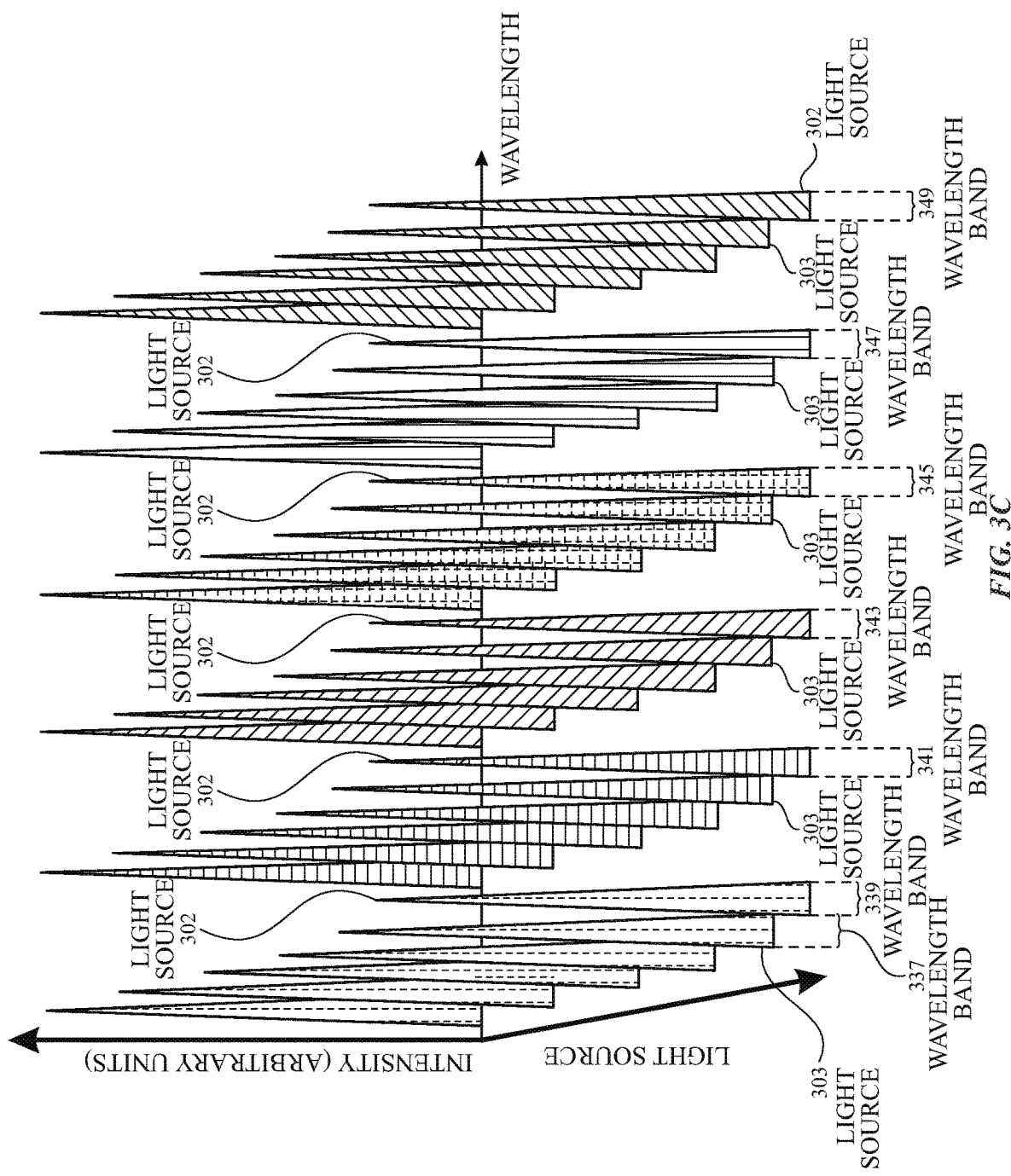
FIG. 3C illustrates an exemplary comb light source and spectrometer output according to examples of the disclosure.

In some examples, each light emitter can be configured to emit a plurality of wavelengths different from the wavelengths emitted by the other light emitters included in a light source and/or spectrometer. FIG. 3C illustrates an exemplary comb light source and spectrometer output according to examples of the disclosure. The spectrometer can include any number of comb light sources including, but not limited to, one comb light source. The light source can be capable of outputting a plurality of wavelengths of light across a spectrum (e.g., visible spectrum) using a plurality of comb light emitters (e.g., light emitter 302, light emitter 303, light emitter 305, light emitter 307, light emitter 309, and light emitter 311 illustrated in FIG. 3A). Each light emitter can output some of the plurality of wavelengths. For example, light emitter 302 can be configured to output light included in wavelength band 339, wavelength band 341, wavelength band 343, wavelength band 345, wavelength 347, and wavelength band 349. In some examples, a light emitter can output one or more wavelengths of light not included in the wavelength bands of another light emitter. For example, light emitter 303 can be configured to emit light, included in wavelength band 337, but not included in wavelength band 339. In some examples, the wavelength bands included in each light emitter can be shifted (in wavelength) relative to the wavelength bands included in the other light emitters. In some examples, at least two wavelength bands can include one or more same wavelengths, but can also include one or more different wavelengths. For example, wavelength band 339 can include 405-445 nm, and wavelength band 337 can include 395-435 nm. Wavelengths 405-435 can be the same wavelengths included in both wavelength band 339 and wavelength band 337; wavelengths 395-405 nm and 435-445 nm can be the different wavelengths included in one wavelength band, but not in the other wavelength band. In this manner, the spectrometer can be capable of measuring one or more sample properties across a spectrum of wavelengths. In some examples, the same wavelengths included in multiple bands can be utilized for signal measurements. In some examples, the same wavelengths included in multiple bands can be utilized for noise measurements (e.g., noise can be detected when multiple signals including the same wavelength have different signal values). The measurement wavelength can be tuned by activating one or more light emitters and/or light sources with a wavelength band including the measurement wavelengths. In some examples, at least two light emitters and/or light sources can be activated at the same time during the measurements.

Although a broadband (e.g., white light) source spectrometer may also be capable of measuring across a spectrum of wavelengths, a broadband source may not be able to discern between signals associated with one or more sample properties and noise. In a comb light source, a light emitter can be activated at times different from other light emitters. Due to the separated (i.e., quantized) wavelength bands for each light emitter, any signal received outside of the wavelength bands (e.g., noise band 237 illustrated in FIG. 2B) of a light emitter can originate from noise (e.g., drift, ambient light, and/or electrical noise). In this manner, analysis of the one or more signals from the detector can be simplified and noise rejection and signal-to-noise ratio (SNR) can be improved.

Furthermore, broadband source spectrometers may use temporal multiplexing for measurements across the spectrum of wavelengths. Each light source can be activated sequentially across the spectrum. Alternatively, a moving mirror (e.g., mirror 134) can be continually enabled as the measurement is being performed across the spectrum. This may lead to long measurement times, moving parts, and/or a large number of light sources. Instead, the comb spectrometer may not require temporal multiplexing to measure multiple wavelengths. Multiple wavelength bands can be measured at a single time.

Moreover, broadband source spectrometers may not be capable of resolving specific wavelengths. For example, broadband source spectrometers may only have a resolution of 2 cm$^{-1}$, where the resolution can be limited by the traveling distance of the moving mirror (e.g., mirror 134). However, in a comb spectrometer, the resolution and the number of spectral lines can be tuned (e.g., increased) by changing the properties (e.g., including more QDs of different sizes) of the QDs and/or the number of comb light emitters and/or light sources.

Figure 4A:
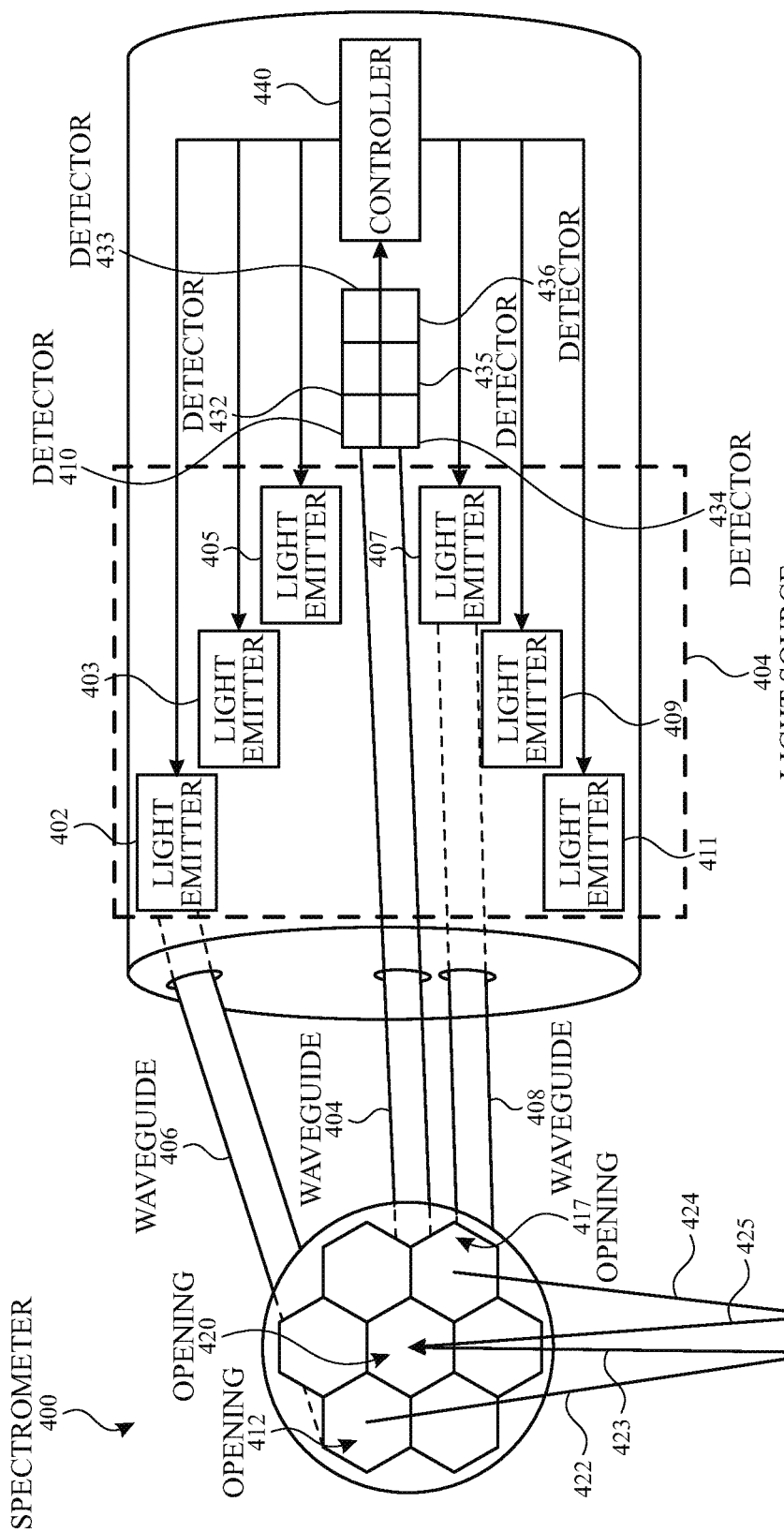
FIG. 4A illustrates an exemplary comb spectrometer including multiple waveguides according to examples of the disclosure.
Figure 4B:
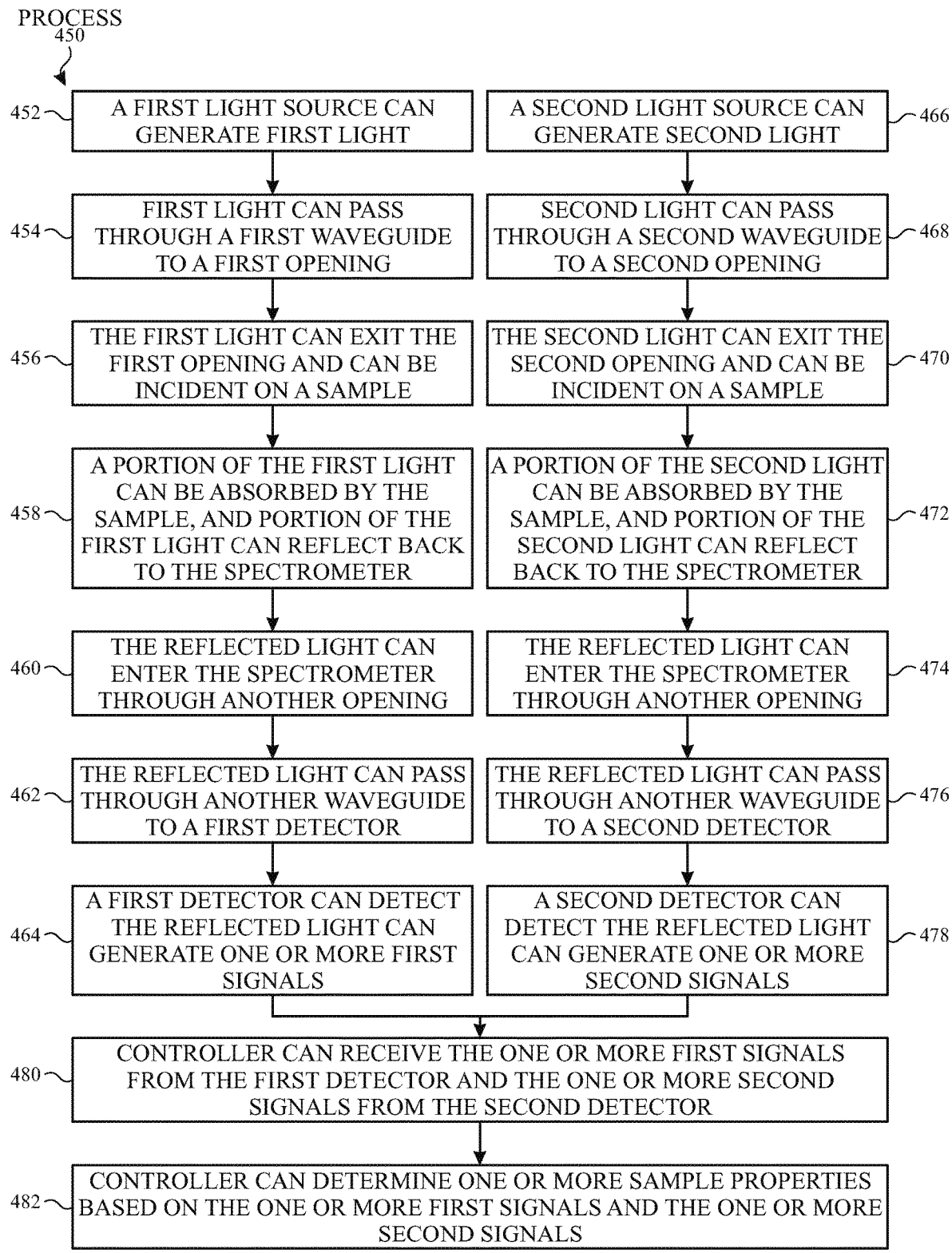
FIG. 4B illustrates an exemplary method for operating a comb spectrometer according to examples of the disclosure.

In some examples, the spectrometer can include a plurality of detectors or detector pixels. FIG. 4A illustrates an exemplary comb spectrometer including multiple waveguides, and FIG. 4B illustrates an exemplary method for operating the comb spectrometer according to examples of the disclosure. Spectrometer 400 can include light source 404, a plurality of detector pixels (e.g., detector 410, detector 432, detector 433, detector 434, detector 435, and detector 436), and controller 440. Light source 404 can include light emitter 402, light emitter 403, light emitter 405, light emitter 407, light emitter 409, and light emitter 411. Each detector or detector pixel can be coupled to one or more different light emitters. In some examples, one or more openings, one or more waveguides, one or more light emitters, and/or one or more detectors (or detector pixels) can be coupled together to form an opening-waveguide-light emitter-detector unit. For example, opening 412 can be optically coupled to waveguide 406, which can be optically coupled to light emitter 402. A first light emitter (e.g., light emitter 402) can emit a first light (e.g., light 422) (step 452 of process 450). The first light (e.g., light 422) can pass through a first waveguide (e.g., waveguide 406) to a first opening (e.g., opening 412) (step 454 of process 450). The first light can exit the first opening and can be incident on a sample (e.g., sample 420) (step 456 of process 450). A portion of the first light can be absorbed by the sample, and a portion of the first light (e.g., light 423) can reflect back to the spectrometer (e.g., spectrometer 400) (step 458 of process 450). The reflected light (e.g., light 423) can enter the spectrometer through another opening (e.g., opening 420) (step 460 of process 450). A detector can be optically coupled to the reflected light to form an opening-waveguide-light emitter-detector unit, such as opening 412-waveguide 406 and waveguide 404-light emitter 402-detector 410 unit. The reflected light can pass through the same or another waveguide (e.g., waveguide 404) to a first detector (e.g., detector 410) (step 462 of process 450). The first detector can detect the reflected light and can generate one or more first signals including information about the reflected light (e.g., light 423) (step 464 of process 450).

In some examples, one or more opening-waveguide-light emitter-detector units can be activated at the same time as another opening-waveguide-light emitter-detector unit. For example, opening 417 can be optically coupled to waveguide 408, which can be optically coupled to light emitter 407. A second light emitter (e.g., light emitter 407) can emit a second light (e.g., light 424) (step 466 of process 450). The second light (e.g., light 424) can pass through a second waveguide (e.g., waveguide 408) to a second opening (e.g., opening 417) (step 468 of process 450). The second light can exit the second opening and can be incident on the sample (e.g., sample 420) (step 470 of process 450). A portion of the second light can be absorbed by the sample, and a portion of the second light (e.g., light 425) can reflect back to the spectrometer (e.g., spectrometer 400) (step 472 of process 450). The reflected light (e.g., light 425) can enter the spectrometer through another opening (e.g., opening 420) (step 474 of process 450). The same or another (second) detector (e.g., detector 436) can be optically coupled to the reflected light (e.g., light 425) to form an opening-waveguide-light emitter-detector unit, such as opening 417-waveguide 408 and waveguide 404-light emitter 407-detector 436 unit. The reflected light can pass through the same or another waveguide (e.g., waveguide 404) to the second detector (e.g., detector 436) (step 476 of process 450). The second detector can detect the reflected light and can generate one or more second signals including information about the reflected light (e.g., light 425) (step 478 of process 450). A processor or controller (e.g., controller 440) can receive the one or more first signals from the first detector (e.g., detector 410) and one or more second signals from the same or another (second) detector (e.g., detector 436) (step 480 of process 450). The controller (e.g., controller 440) can determine one or more sample properties (e.g., sample 420) based at least partially on the one or more first signals and one or more second signals (step 482 of process 450).

Figure 4C:
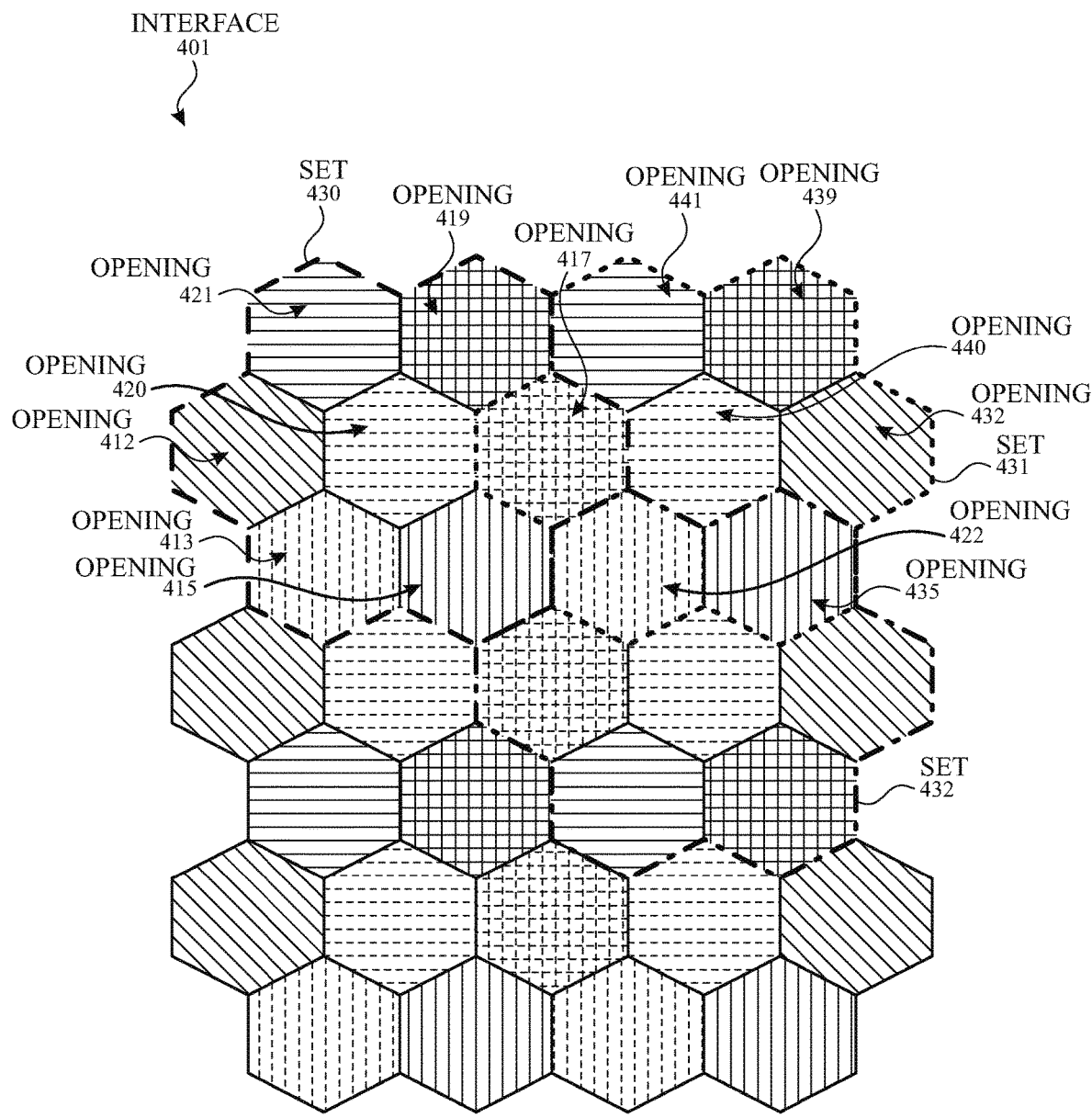
FIG. 4C illustrates an exemplary configuration for a comb spectrometer interface according to examples of the disclosure.

In some examples, the spectrometer can include a plurality of detectors; each detector can be coupled to a comb light source. FIG. 4C illustrates an exemplary configuration for a comb spectrometer interface according to examples of the disclosure. Interface 401 can include a plurality of sets of openings, such as set 430, set 431, and set 432. Each set can include a plurality of openings coupled to a comb light source. For example, set 430 can include opening 412, opening 413, opening 415, opening 417, opening 419, and opening 421, where each opening in a set can be coupled to a different comb light emitter. A set can further include an opening coupled to a detector. For example, set 430 can include opening 420, which can be coupled to a detector. Within a set, the detector can detect reflected light off a sample from light emitted by the comb light emitters.

In some examples, an opening can be included in more than one set. For example, opening 417 can be included in both set 430 and set 431. In some examples, at least two sets can include an opening coupled to the same comb light emitter. For example, opening 413 included in set 430 can be coupled to the same comb light emitter as opening 422 included in set 431. In some examples, at least two sets can include an opening coupled to different comb light emitters, where the different comb light emitters can have the same optical properties (e.g., wavelength bands).

Although FIG. 4C illustrates one configuration, examples of the disclosure can include any configuration including a plurality of comb light emitters and at least one detector within a set. In some examples, the configuration can be such that the comb light emitters are intermeshed together to prevent optical interference with each other. For example, relative to opening 421, opening 413 can be located on the opposite side of opening 420. Opening 419 can be adjacent to opening 421 and can be located on the same side of set 430 with respect to opening 420 as opening 421. Relative to opening 413, opening 415 can be located on the same side of set 430 with respect to opening 420 as opening 415. In this manner, opening 421 and opening 419 can be located on opposite sides of opening 420 as opening 413 and opening 415. Opening 412 and opening 417 can be adjacent to opening 420, but located on opposite sides of opening 420. In some examples, the configuration can be such that each detector can be surrounded by unique (i.e., different wavelength bands) comb light emitters. As illustrated in FIG. 4C, opening 420 can be surrounded by opening 412, opening 413, opening 415, opening 417, opening 419, and opening 421, where each opening can be coupled to a unique comb light emitter. Set 431 can be configured such that interference of the same comb light emitter or comb light emitters with the same optical properties (e.g., one or more same wavelength bands) can be prevented. Opening 441 can be coupled to the same comb light emitter (or comb light emitters having the same optical properties) as opening 421, but can be separated from opening 421 by opening 419. Opening 439 can be coupled to the same comb light emitter (or comb light emitters having the same optical properties) as opening 419, but can be separated from opening 419 by opening 417. Opening 422 can be coupled to the same comb light emitter (or comb light emitters having the same optical properties) as opening 413, but can be separated from opening 413 by opening 415. Opening 435 can be coupled to the same comb light emitter (or comb light emitters having the same optical properties) as opening 415, but can be separated from opening 415 by opening 422. Opening 432 can be coupled to the same comb light emitter (or comb light emitters having the same optical properties) as opening 421, but can be located on the outer edge of set 431, whereas opening 412 can be located on the outer edge of set 430. In this manner, opening 420, opening 417, and opening 440 can be located between and can separate (i.e., prevent or reduce interference) light emitted through opening 432 from light emitted through opening 412.

Unlike a broadband source spectrometer, the comb spectrometer, as disclosed, can be capable of measuring different spatial locations along the sample without the need for mechanical moving parts, a beamsplitter (e.g., beamsplitter 130) or prism to measure multiple locations along the sample. Instead, one or more different comb light emitters corresponding to different opening (in the interface) locations can be activated in the comb spectrometer, forming a spectrometer capable of measuring multiple wavelengths without spatial multiplexing. In some examples, the sample may be heterogeneous, so inclusion of the plurality of detectors can reduce measurement uncertainty due to heterogeneity.

Spectrometer 400 can include a plurality of detectors, where each detector can be associated with a different wavelength band. Referring back to FIG. 2B and FIG. 4A, for example, detector 410 can be associated with wavelength band 239. Detector 432 can be associated with wavelength band 241. Detector 433 can be associated with wavelength band 243. Detector 434 can be associated with wavelength band 245. Detector 435 can be associated with wavelength band 247. Detector 436 can be associated with wavelength band 249. Each detector can generate a separate signal(s). Controller 440 can receive the plurality of signals and can reject noise based on the association of each detector with wavelength band. For example, controller 440 can receive one or more signals generated by detector 436. Any signal outside wavelength band 249 can be rejected in the analysis of the sample properties.

Figure 5A:
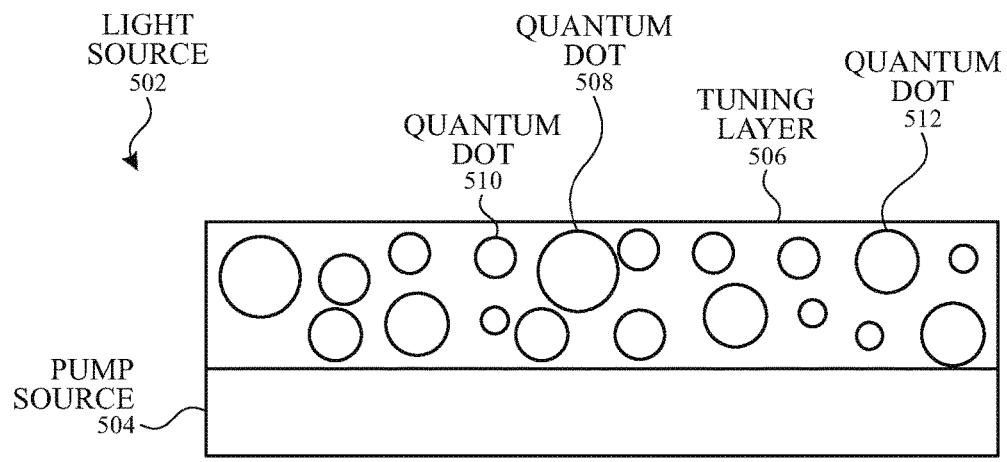
FIGS. 5A-5C illustrate cross-sectional views of exemplary comb light sources according to examples of the disclosure.
Figure 5B:
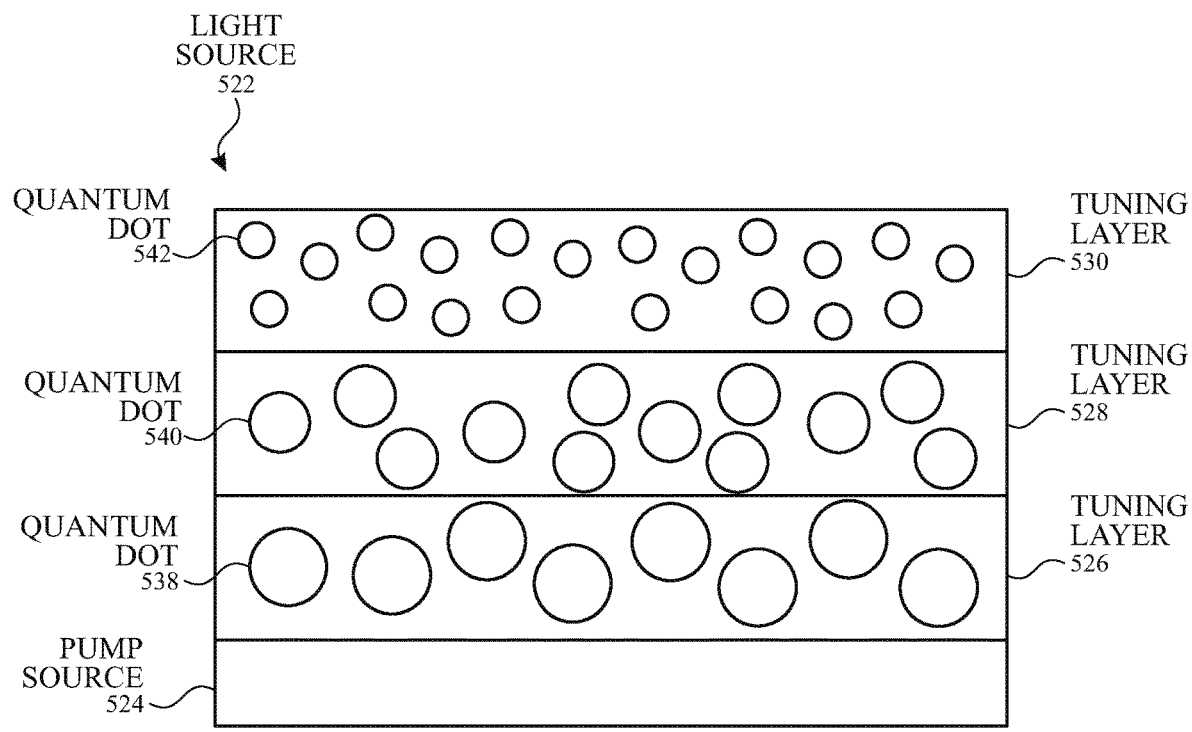

In some examples, the spectrometer can include comb light sources. FIGS. 5A-5B illustrate cross-sectional views of exemplary comb light sources according to examples of the disclosure. In some examples, the comb light source can be a QD comb light source. The QD comb light source can be configured with one or more QDs, where one or more wavelengths of light emitted by the comb light source can be based on the properties of the QDs. Light source 502 can include pump source 504 and tuning layer 506, as illustrated in FIG. 5A. Pump source 504 can be any source capable of generating light, including, but not limited to, a lamp, a laser, a light emitting diode (LED), an organic LED (OLED), an electroluminescent (EL) source, a super-luminescent laser diode, any super-continuum source (e.g., a fiber-based source), or a combination of one or more of these sources. Tuning layer 506 can be any optical component capable of filtering or selecting one or more wavelengths of light emitted by pump source 504. For example, tuning layer 506 can include one or more QDs, such as quantum dot 508, quantum dot 510, and quantum dot 512. The one or more QDs can be small, nanocrystal phosphors with quantized energy levels. Energy from pump source 504 can excite electrons with sufficient energy to jump to the next energy level. The electron may want to return to its lowest energy state or the ground state, and in doing so, can release energy in the form of electromagnetic radiation with a wavelength corresponding to a difference between the lowest energy state and the ground state. The size of the QDs can lead to quantum confinement resulting in energy levels that can be discrete and quantized with finite separation. By changing the size of the QD, the emission wavelength of the QD can be shifted and nearly any frequency of light in the visible spectrum can be achieved.

The QDs can be pumped by any pump source having a shorter wavelength (i.e., higher energy) of light. For example, a UV source (<400 nm) can be used to excite a blue (450 nm-500 nm), green (500 nm-570 nm), and/or red (610 nm-760 nm) QDs. Larger QDs can emit longer wavelengths of light. For example, 6 nm diameter QDs can be fabricated for red light; 4 nm diameter QDs can be fabricated for green light; and 2 nm QDs can be fabricated for blue light. In some examples, tuning layer 506 can include a plurality of QDs with different sizes. For example, quantum dot 510 (e.g., emitting blue light) can have a smaller diameter and shorter wavelength emission than quantum dot 508 (e.g., emitting red light). Quantum dot 508 can have a smaller diameter and shorter wavelength emission than quantum dot 512 (e.g., emitting green light). In this manner, a single tuning layer can be used for emitting a plurality (e.g., three) of wavelength bands (e.g., wavelength band 341, wavelength band 343, and wavelength band 347 illustrated in FIG. 3C)

In some examples, the light source can comprise a plurality of tuning layers, as illustrated in FIG. 5B. Light source 522 can include pump source 524, tuning layer 526, tuning layer 528, and tuning layer 530. Pump source 524 can be any source capable of generating light, including, but not limited to, a lamp, a laser, a LED, an OLED, an EL source, a super-luminescent laser diode, any super-continuum source, or a combination of one or more of these sources. Tuning layer 526, tuning layer 528, and/or tuning layer 530 can be any optical component capable of filtering or selecting one or more wavelengths of light emitted by pump source 524. For example, one or more of the tuning layers can be configured to receive light emitted by pump source 524 and can allow one or more wavelengths of light to pass through. Tuning layer 526 can include quantum dots 538; tuning layer 528 can include quantum dots 540; and tuning layer 530 can include quantum dots 542. In some examples, at least one tuning layer can have QDs with a different size than the QDs in another tuning layer. For example, quantum dots 538 can have a larger diameter (and longer wavelength emission) than quantum dots 540. In some examples, quantum dots 540 can have a larger diameter (and longer wavelength emission) than quantum dots 542. In some examples, light source 522 can have a non-gradient variation in QD size. For example, quantum dots 542 can have a larger diameter (and longer wavelength emission such as red light) than quantum dots 540, which can have a smaller diameter than quantum dots 538.

The QDs included in the comb light source can have one or more properties based on the performance output of the light source. In some examples, the density of the QDs can be tuned based on the intensity of light emitted by the light source. For example, a greater density of QDs can increase the amount of energy absorbed by the QDs, which can in turn increase the total amount of energy (i.e., intensity) emitted. In some examples, the density of the QDs can be based on the relative location of the tuning layer within the light source stackup. For example, tuning layer 526 can have a lower density of quantum dots 538 (than the density of quantum dots 540 included in tuning layer 528) to prevent quantum dots 538 from absorbing all the incoming energy from pump source 524. The density of quantum dots 538 can be configured such that at least some energy from pump source 524 "leaks" out to tuning layer 528. In some examples, tuning layer 528 can have a lower density of quantum dots 540 (than the density of quantum dots 542 included in tuning layer 528) to prevent quantum dots 540 from absorbing all remaining (e.g., energy not absorbed by tuning layer 526) energy from pump source 524. In this manner, at least some of the energy from pump source 524 can reach all the tuning layers (e.g., tuning layer 526, tuning layer 528, and tuning layer 530).

In some examples, the thickness of a tuning layer can be based on the output wavelength. For example, a tuning layer can be configured with a greater thickness for longer wavelengths, or a tuning layer can be configured with a lower thickness for shorter wavelengths. In some examples, the thicknesses of the tuning layers can be different. In some examples, tuning layer 526 can be thicker than tuning layer 528, which can be thicker than tuning layer 530. In some examples, with the comb light sources, one or more filters can be excluded from the spectrometer.

Although FIG. 5B illustrates three tuning layers, examples of the disclosure can include any number of tuning layers. Furthermore, although FIG. 5B illustrates a gradient change in QD densities in the light source stackup, examples of the disclosure can include any configuration of QD densities (e.g., tuning layer 528 has the highest density of QDs relative to the density of QDs in tuning layer 530 and tuning layer 526).

Figure 5C:
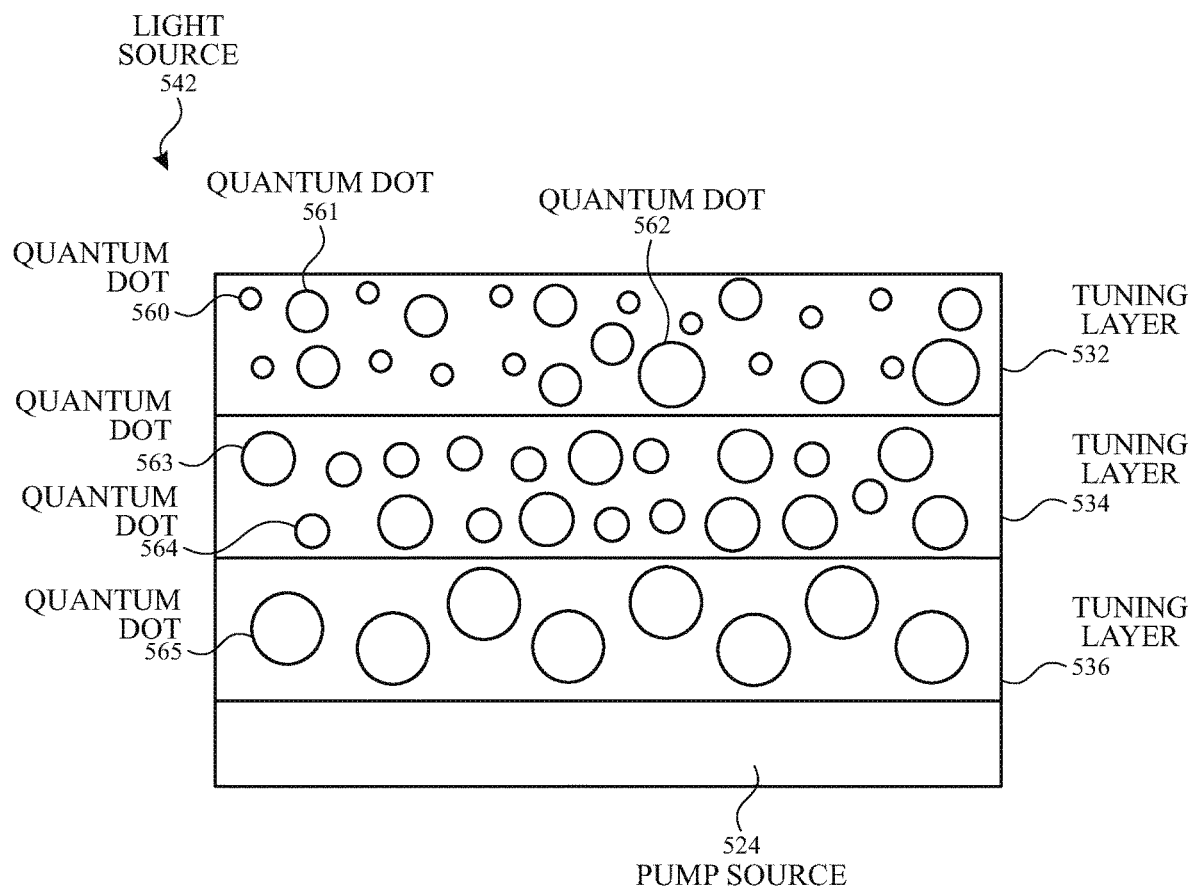

In some examples, the light source can include a plurality of tuning layers, where at least one tuning layer can have at least two QDs with different sizes, as illustrated in FIG. 5C. Light source 542 can include pump source 524, tuning layer 532, tuning layer 534, and tuning layer 536. Tuning layer 532 can include quantum dots 560, quantum dots 561, and quantum dots 562, where each can have different sizes. In some examples, the number of differently sized QDs can be different relative to other tuning layers. For example, tuning layer 532 can include three differently sized QDs (e.g., quantum 560, quantum dot 561, and quantum dot 562), whereas tuning layer 534 can include two differently sized QDs (e.g., quantum dot 563 and quantum dot 564). In some examples, at least one tuning layer can include QDs with one size (e.g., quantum dot 565 included in tuning layer 536).

In some examples, the spectrometer can include one or more filters, such as QD filters. The one or more filters can be located between the light source and the detector. For example, a filter can be disposed on or located in close proximity to the light emitter and/or light source. In some examples, a filter can be disposed on or located in close proximity to the detector. Utilization of the one or more filters can allow the spectrometer capability of direct separation (i.e., separation of light without further processing by the controller) of wavelength bands. Moreover, the spectrometer can be configured to allow reflected light originating from multiple light emitters to be incident on the detector without affecting the direct separation capability. As a result, the number of waveguides can be reduced to one waveguide, for example, configured to allow the reflected light including multiple wavelength bands to pass through. The one or more filters can separate the reflected light based on its wavelength band.

Figure 6A:
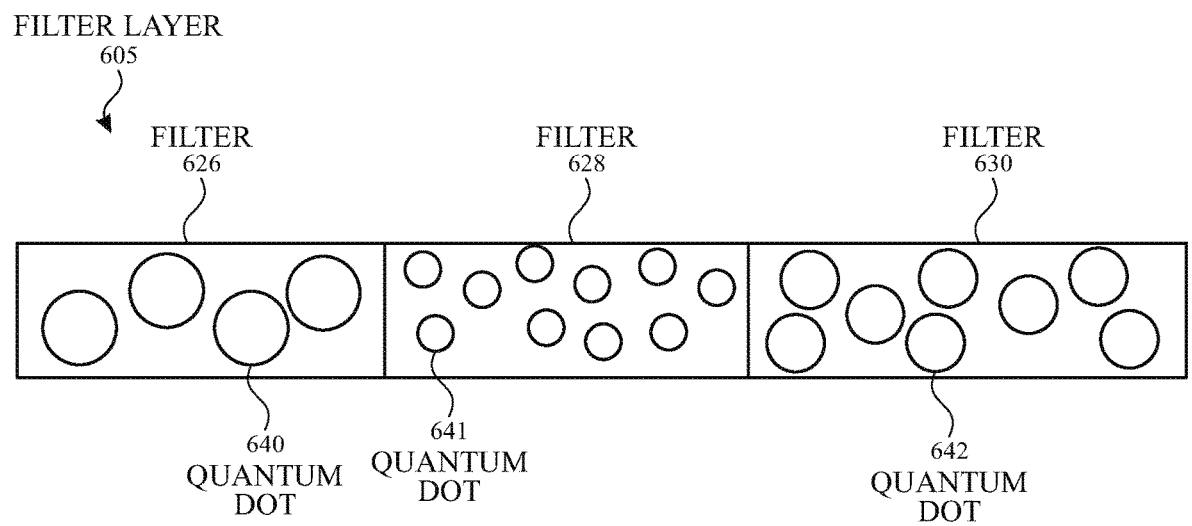
FIGS. 6A-6B illustrate top and cross-sectional views of a QD filter according to examples of the disclosure.
Figure 6B:
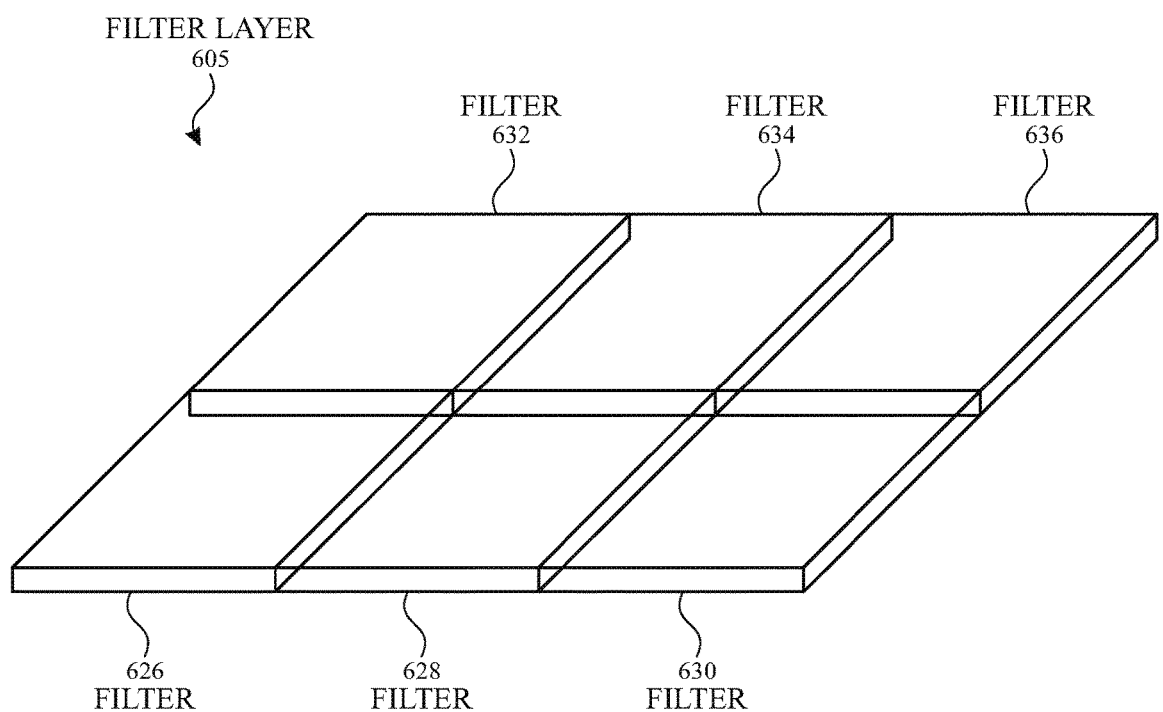

FIGS. 6A-6B illustrate top and cross-sectional views of a QD filter according to examples of the disclosure. Filter layer 605 can include a plurality of filters, such as filter 626, filter 628, filter 630, filter 632, filter 634, and filter 636. Each filter can include a plurality of QDs. Filter 626 can include a plurality of quantum dots 640; filter 628 can include a plurality of quantum dots 641; and filter 630 can include a plurality of quantum dots 642. Each filter can be configured for selectively allowing light having one or more wavelengths included in a wavelength band to pass through and configured for rejecting light with all other wavelengths. In some examples, at least two of the filters included in the filter layer can selectively allow different wavelength bands. For example, filter 626 can be configured for selectively allowing light included in one wavelength band (e.g., wavelength band 247 illustrated in FIG. 2B), and filter 628 can be configured for selectively allowing light included in another wavelength band (e.g., wavelength band 241 illustrated in FIG. 2B).

FIG. 6C illustrates exemplary spectral absorbance for QD step filters and the calculated transmittance according to examples of the disclosure. Filter 626 can be configured to absorb light having a wavelength between wavelength 625 and wavelength 627. Light with wavelengths longer (i.e., smaller energy) than the output wavelength of quantum dots 640 can pass through filter 626. Light with wavelengths shorter (i.e., greater energy) than the output wavelength of quantum dots 640 can be absorbed by filter 626. Filter 626 can be optically coupled to one or more light emitters (e.g., light emitter 402 illustrated in FIG. 4A), one or more detectors (e.g., detector 410 illustrated in FIG. 4A), one or more openings (e.g., opening 412 illustrated in FIG. 4A) included in the interface, or any combination thereof. The detector optically coupled to filter 626 can generate one or more first signals. Filter 628 can be configured to absorb light having a wavelength between wavelength 625 and wavelength 629. Light with wavelengths longer (i.e., smaller energy) than the output wavelength of quantum dots 641 can pass through filter 628. Light with wavelengths shorter (i.e., greater energy) than the output wavelength of quantum dots 641 can be absorbed by filter 628. Filter 628 can be optically coupled to one or more light emitters (e.g., light emitter 403 illustrated in FIG. 4A), one or more detectors (e.g., detector 432 illustrated in FIG. 4A), one or more openings included in the interface, or any combination thereof. The detector optically coupled to filter 628 can generate one or more second signals. A controller can subtract the one or more first signals (associated with filter 626) from the one or more second signals (associated with filter 628) to create a passband (illustrated in the calculated transmittance plot on the bottom of FIG. 6C) allowing light with a wavelength between wavelength 627 and wavelength 629 to pass through. Although FIG. 6C illustrates a bandpass filter formed from subtracting the signals from two step filters, examples of the disclosure can include any number of step filters to create the bandpass filter. In some examples, one or more filters can include QDs with different properties to allow multiple wavelength bands to pass through the filter. In some examples, the spectrometer can be configured with six wavelength bands, formed with three filters and two different QDs per filter.

Figure 7A:
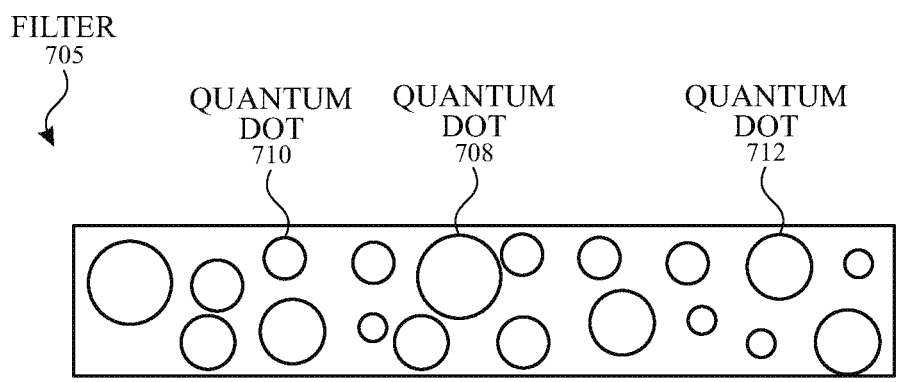
FIG. 7A illustrates a cross-sectional view of an exemplary QD filter according to examples of the disclosure.
Figure 7B:
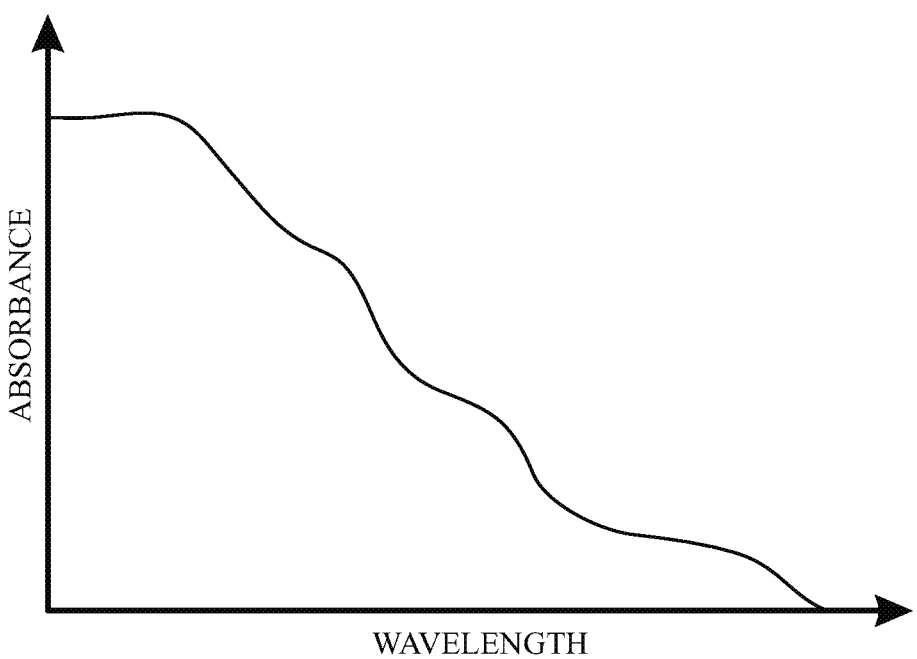
FIG. 7B illustrates a spectral output of an exemplary QD filter according to examples of the disclosure.

FIG. 7A illustrates a cross-sectional view of an exemplary QD filter according to examples of the disclosure. Filter 705 can include a plurality of QDs having different properties. Filter 705 can include quantum dots 708, quantum dots 710, and quantum dots 712. Quantum dots 708, quantum dots 710, and quantum dots 712 can be configured with different sizes, which can lead to different wavelengths of absorbance and transmittance. Quantum dots 708, quantum dots 710, and quantum dots 712 can be further configured with different densities, which can tune the intensity of absorbance and transmittance, as illustrated in the filter spectral output illustrated in FIG. 7B. In some examples, the distribution of the QDs included in the filter can be tailored based on a targeted passband output.

In some examples, a filter can be optically coupled to multiple light emitters and/or light sources, thereby reducing the number of filters, number of light emitters, and/or number of light sources included in the spectrometer. For example, a broadband source spectrometer configured to measure 30 different wavelength bands may require 30 different detectors (or detector pixels) and 30 different filters. On the other hand, a comb spectrometer can be configured to measure the 30 different wavelength bands with six different light sources, five detector pixels, and five filters.

In some examples, a filter can be configured to allow light included in different wavelength bands to pass through. In some examples, one or more filters can be configured to allow a wide range (e.g., one or more wavelength bands) of wavelengths to pass through, and a narrow band (e.g., a subset of wavelengths included in a wavelength band) can be selected by illuminating a specific comb light emitter. For example, a filter can be configured to allow light included in wavelength band 337 and wavelength band 339 (illustrated in FIG. 3C) to pass through, and either light emitter 302 (for wavelength band 339) or light emitter 303 (for wavelength band 337) can be activated to select the narrower band including the targeted measurement wavelength(s).

FIGS. 8A-8B illustrate exemplary waveguide configurations according to examples of the disclosure. In some examples, multiple light sources can be coupled to a single waveguide. For example, as illustrated in FIG. 8A, light source 802, light source 803, and light source 805 can be coupled to interface 801 using a single waveguide 804. By using multiple light sources to generate light including multiple wavelength bands, one or more light sources can be turned off to conserve power. In some examples, a light source can be coupled to multiple waveguides. For example, as illustrated in FIG. 8B, light source 802 can be coupled to different openings included in interface 801 using at least waveguide 804 and waveguide 806. In some examples, each waveguide can be coupled to a different wavelength band and/or detector.

In some examples, the properties of one or more waveguides (e.g., optical fibers or silicon photonics waveguides) can configured to allow sufficient light mixing. For example, an optical fiber can be configured with a length (e.g., greater than or equal to 1 mm) equal to a multiple of the emission wavelength of the light emitter and/or light source to which the optical fiber is coupled to. In some examples, the multiple can be large, such as a multiple greater than three. In some examples, the diameter of the optical fiber can large compared to the emission wavelength of the light emitter and/or light source to which the optical fiber is coupled to.

Figure 9:
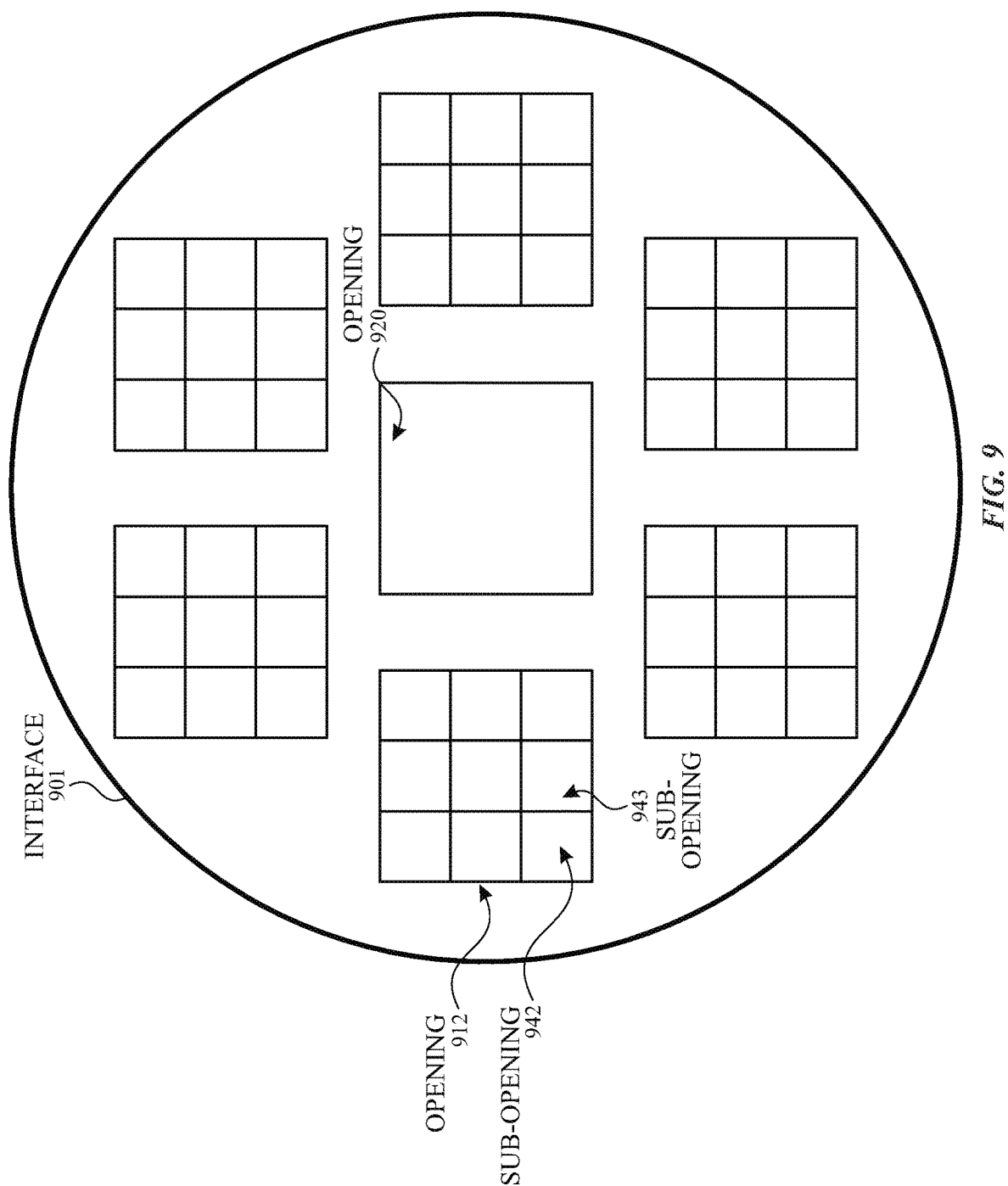
FIG. 9 illustrates a top view of an exemplary configuration for a comb spectrometer interface according to examples of the disclosure.

FIG. 9 illustrates a top view of an exemplary configuration for a comb spectrometer interface according to examples of the disclosure. Interface 901 can include a plurality of openings, such as opening 912, coupled to one or more light sources. Each opening can include a plurality of sub-openings, such as sub-opening 942 and sub-opening 943. Each sub-opening can be coupled to a light emitter and can be associated with a wavelength band. In some examples, each sub-opening can be associated with a different wavelength band by, e.g., being associated to a different filter. For example, sub-opening 942 can be associated with wavelength band 339 (illustrated in FIG. 3C), and sub-opening 943 can be associated with wavelength band 341 (illustrated in FIG. 3C). In some examples, each sub-opening can be optically coupled to a different detector. In some examples, each opening (e.g., opening 912) coupled to one or more light sources located within close proximity (e.g., less than 1 mm away) to one or more openings (e.g., opening 920) coupled to one or more detectors.

Figure 10:
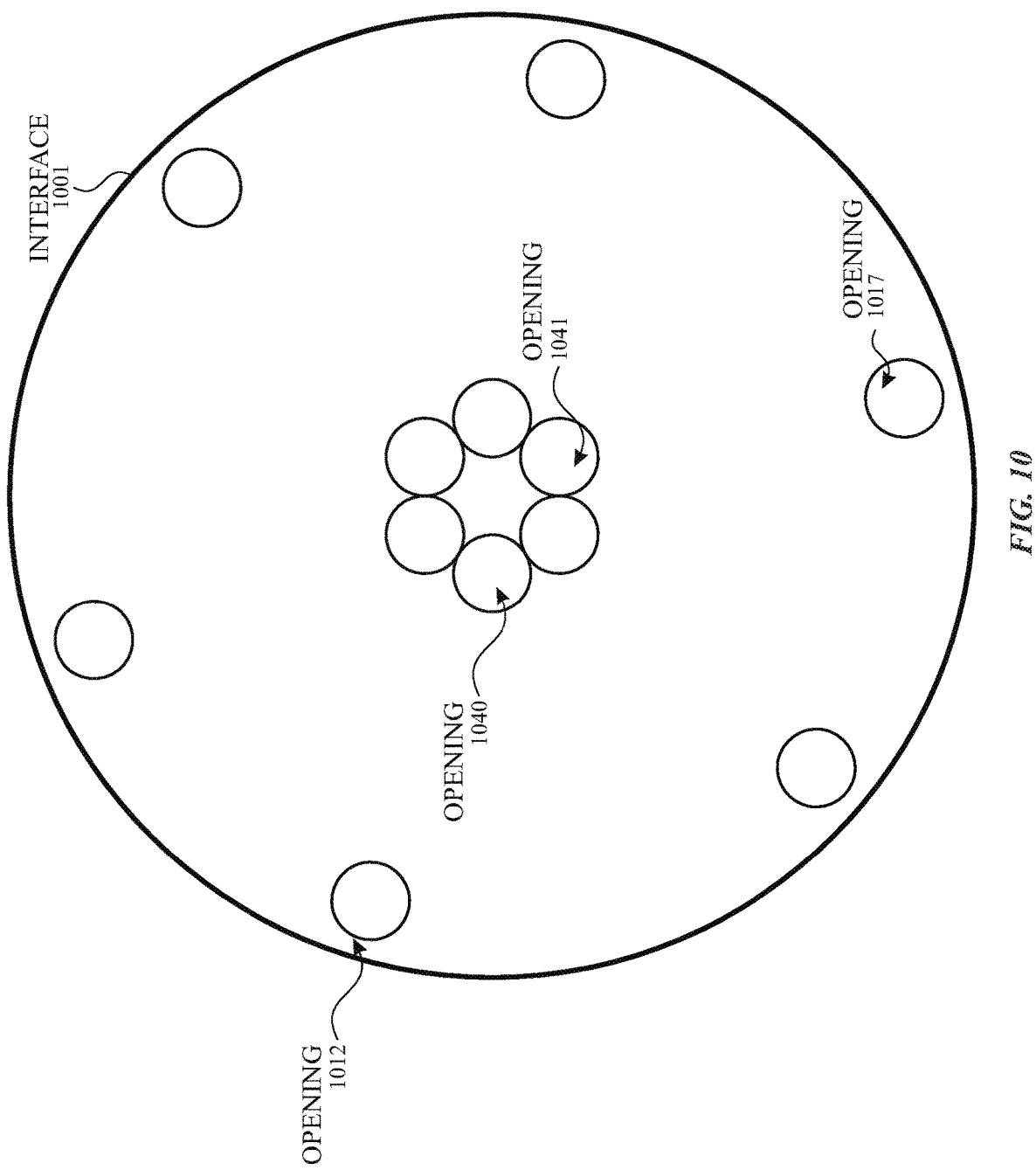
FIG. 10 illustrates a top view of an exemplary configuration for a comb spectrometer interface according to examples of the disclosure.

Although interface 901 can be configured to allow wavelength bands to be spatially separated and can simplify the implementation and analysis, one or more path lengths within an opening may differ. For example, reflected light entering sub-opening 942 can have a longer path length than reflected light entering sub-opening 943, merely due to the center of sub-opening 942 being located further away from opening 920 than the center of sub-opening 943. FIG. 10 illustrates a top view of an exemplary configuration for a comb spectrometer interface according to examples of the disclosure. Interface 1001 can include a plurality of openings, such as opening 1012, coupled to one or more light sources (referred to as light source openings). Interface 1002 can further include one or more openings, such as opening 1040 and opening 1041, coupled to one or more detectors (referred to as detector openings). Each light source opening (e.g., opening 1012) can be located a distance away from an opening (e.g., opening 1040 or opening 1041) coupled to one or more detectors. In some examples, the distance can be greater than 1 mm. In some examples, the distance can be greater than 2 mm. In some examples, the distance can be such that the reflected light has a long path length. In some examples, due to the greater distance between the one or more detector openings and the one or more light source openings, any path length difference between sub-openings (e.g., opening 1042 and opening 1043) may have a negligible effect on the measurement accuracy. In some examples, due to the longer path length(s), the measured sample (e.g., sample 420 illustrated in FIG. 4A) can be used for light mixing, in addition to or instead of, using one or more waveguides to light mixing. In some examples, one or more openings can be coupled to a light emitter, and interface 1001 can exclude one or more sub-openings.

In some examples, interface 1001 can include multiple openings, such as opening 1040 and opening 1041, and each opening can be coupled to one or more detectors. In some examples, the multiple openings can be located in the center of interface 1001. The location of the multiple openings can be such that the separation distances between an opening coupled to a light source and an opening coupled to a detector are the same. For example, the separation distance between opening 1012 (coupled to a light source) and opening 1040 (coupled to a detector) can be the same as the separation distance between opening 1017 (coupled to a light source) and opening 1041. In some examples, each opening coupled to one or more detectors can include one or more different wavelength bands.

Figure 11A:
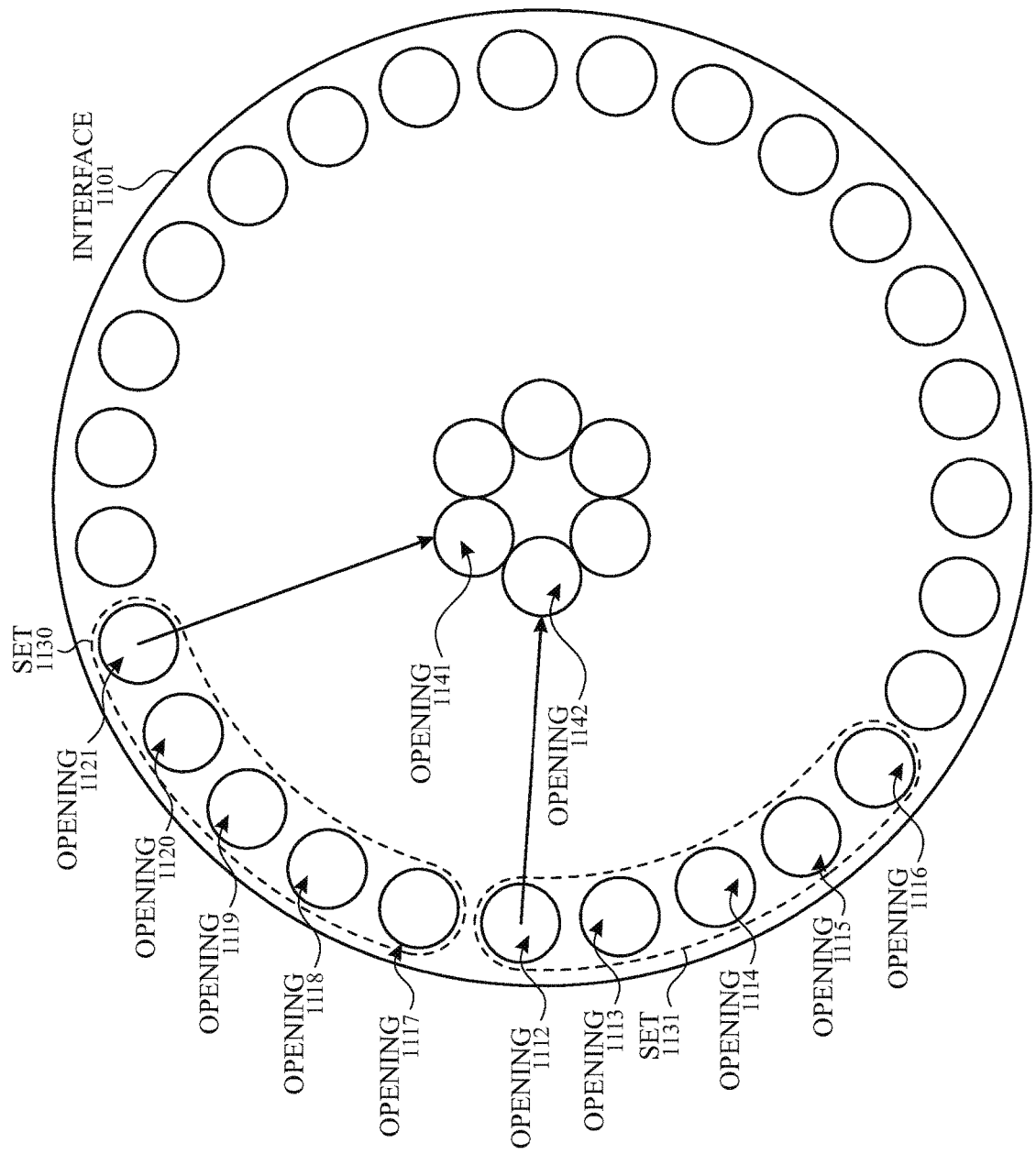
FIG. 11A illustrates a top view of an exemplary ring configuration for a comb spectrometer interface according to examples of the disclosure.

In some examples, the interface can include a ring of openings coupled to one or more light sources. FIG. 11A illustrates a top view of an exemplary ring configuration for a comb spectrometer interface according to examples of the disclosure. Interface 1101 can include a plurality of openings, such as opening 1117, opening 1118, opening 1119, opening 1120, and opening 1121, coupled to one or more light sources (referred to as light source openings). In some examples, each opening can include a plurality of sub-openings (e.g., sub-opening 942 and sub-opening 943 illustrated in FIG. 9). The plurality of light source openings can form a ring (or another closed shape) or a partial ring (e.g., one or more arcs or non-circular sections) (or another partial shape). In some examples, interface 1101 can include at least one set of openings, such as set 1130 and set 1131. A set of openings can include neighboring openings that can be coupled to different comb light sources (and/or comb light emitters). For example, opening 1117, opening 1118, opening 1119, opening 1120, and opening 1121 can be coupled to different light sources. In some examples, the different light sources can include wavelength bands that are shifted relative to the other light sources coupled to the openings in the same set. In some examples, the different lights sources coupled to the openings in the same set taken together can form a continuous spectrum. In some examples, light source openings within a set can be optically coupled to the same detector opening. For example, opening 1117, opening 1118, opening 1119, opening 1120, and opening 1121 can be optically coupled to opening 1141.

In some examples, at least one light source opening in one set can be optically coupled to the same light source as another light source opening in another set. For example, opening 1121 included in set 1130 can be optically coupled to the same light source (or different light sources having the same optical properties) as opening 1112 included in set 1131. In some examples, for openings optically coupled to the same light source (or to different light sources having the same optical properties), the separation distance between the light source opening and detector opening can be the same. For example, the separation distance between opening 1121 and opening 1141 can be the same as the separation distance between opening 1112 and opening 1142. Some openings (e.g., opening 1141 and opening 1142) can be located in the center, and other openings can be located in the periphery (e.g., opening 1121 and opening 1112). The separation distances between the openings located in the center and the openings located in the periphery can be the same, which can lead to the same path lengths through the sample. Heterogeneity in the sample (at locations measured between the center openings and peripheral openings) can be addressed by having multiple peripheral openings associated with the combs having the same optical properties (e.g., wavelength). In some examples, the interface can include different ring patterns and/or different opening locations to address heterogeneity in the same at locations in close proximity to the center openings.

In some examples, each set of openings (coupled to one or more light sources) included in interface 1101 can have the same configuration. For example, opening 1121 (included in set 1130) and opening 1112 (included in set 1131) can be optically coupled to the same light source (or to different light sources having the same optical properties). Similarly, opening 1120 (included in set 1130) and opening 1113 (included in set 1131) can be optically coupled to the same light source (or to different light sources having the same optical properties). Opening 1119 (included in light set 1130) and opening 1114 (included in set 1131) can be optically coupled to the same light source (or to different light sources having the same optical properties). Opening 1118 (included in light set 1130) and opening 1115 (included in light set 1131) can be optically coupled to the same light source (or to different light sources having the same optical properties). Opening 1117 (included in light set 1130) and opening 1116 (included in light set 1131) can be optically coupled to the same light source (or to different light sources having the same optical properties). The spectrometer operation can include activating light comb sources have the same optical properties (e.g., one or more wavelength bands) at the same time to take a measurement, and sequentially activating other light comb sources having the same optical properties to take other measurements until the wavelength bands are measured.

Figure 11B:
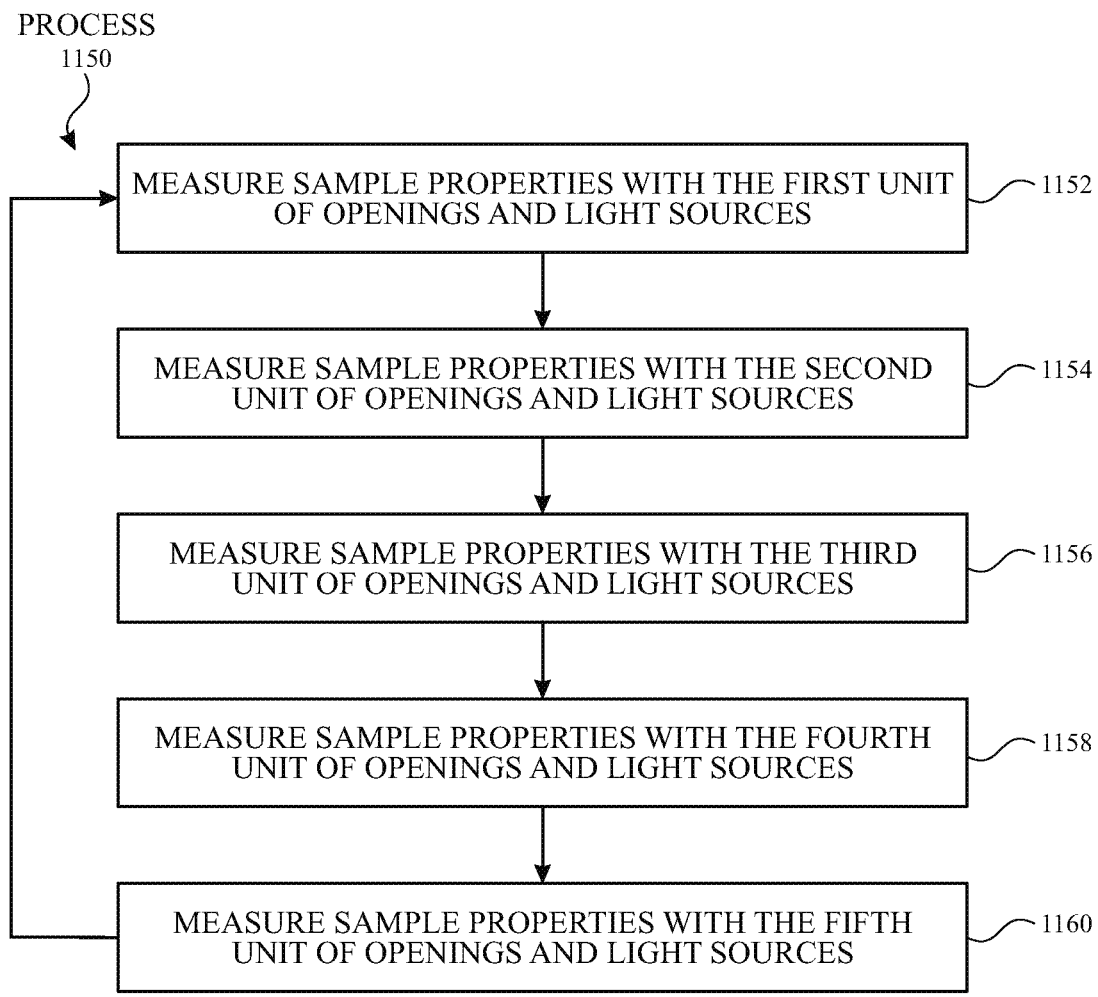
FIG. 11B illustrates an exemplary method for operating a ring comb spectrometer interface according to examples of the disclosure.

FIG. 11B illustrates an exemplary method for operating a ring comb spectrometer interface according to examples of the disclosure. Light sources having the same optical properties can be referred to as units. The light source coupled to opening 1121 and the light source coupled to opening 1112 (referred to as "first units" in FIG. 11B) can have the same optical properties, and one or more sample properties can be measured using these light sources (step 1152 of process 1150). The light source coupled to opening 1120 and the light source coupled to opening 1113 (referred to as "second units" in FIG. 11B) can have the same optical properties, and one or more sample properties can be measured using these light sources (step 1154 of process 1150). The light source coupled to opening 1119 and the light source coupled to opening 1114 (referred to as "third units" in FIG. 11B) can have the same optical properties, and one or more sample properties can be measured using these light sources (step 1156 of process 1150). The light source coupled to opening 1118 and the light source coupled to opening 1115 (referred to as "fourth units" in FIG. 11B) can have the same optical properties, and one or more sample properties can be measured using these light sources (step 1158 of process 1150). The light source coupled to opening 1117 and the light source coupled to opening 1116 (referred to as "fifth units" in FIG. 11B) can have the same optical properties, and one or more sample properties can be measured using these light sources (step 1160 of process 1150). The process can be repeated. Although FIG. 11B refers to two light sources and two openings included in a unit, the units can include any number of light sources and any number of openings coupled to the light sources.

Figure 12A:
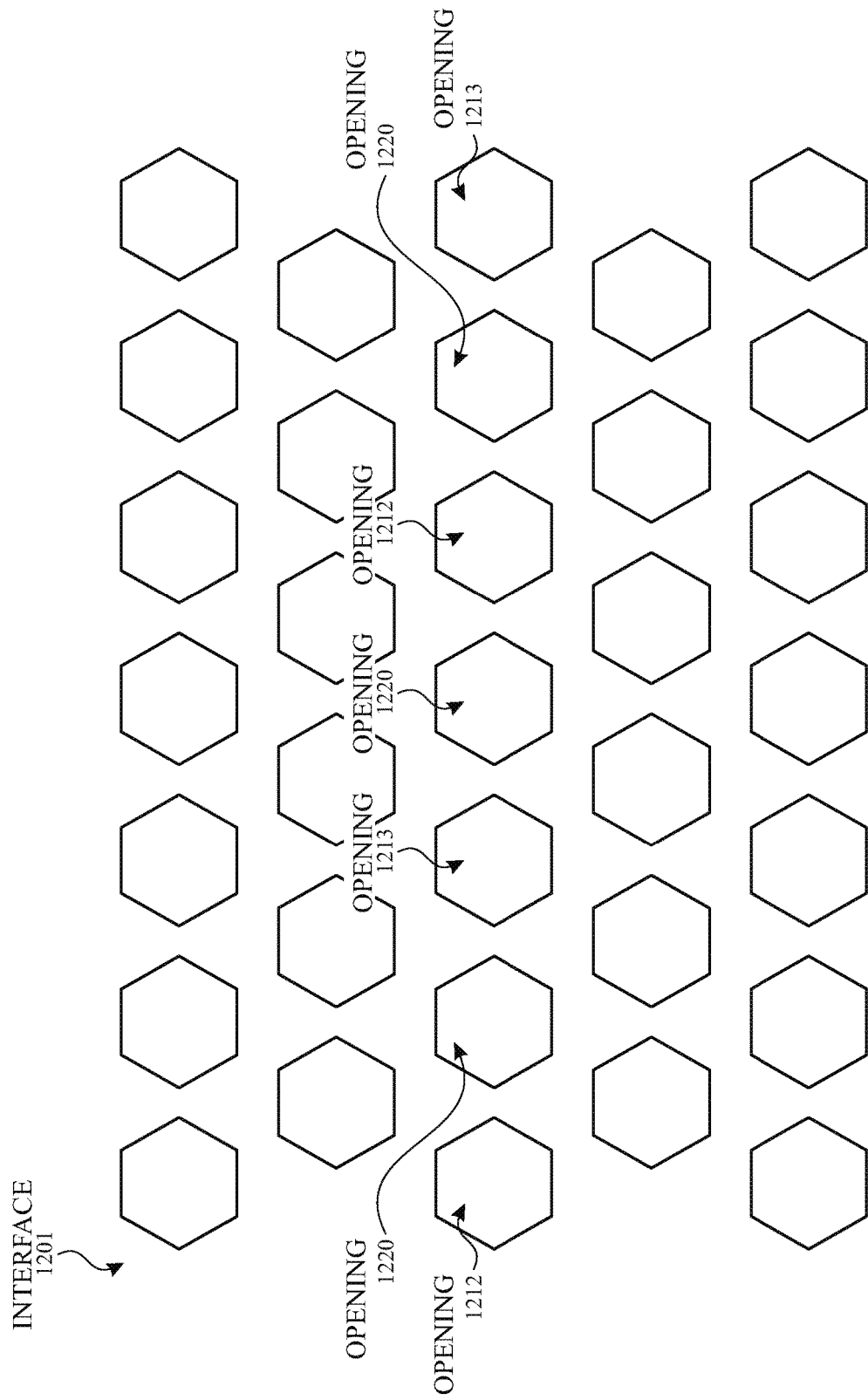
FIGS. 12A-12B illustrate top and cross-sectional views of an exemplary interleaved comb spectrometer according to examples of the disclosure.
Figure 12B:
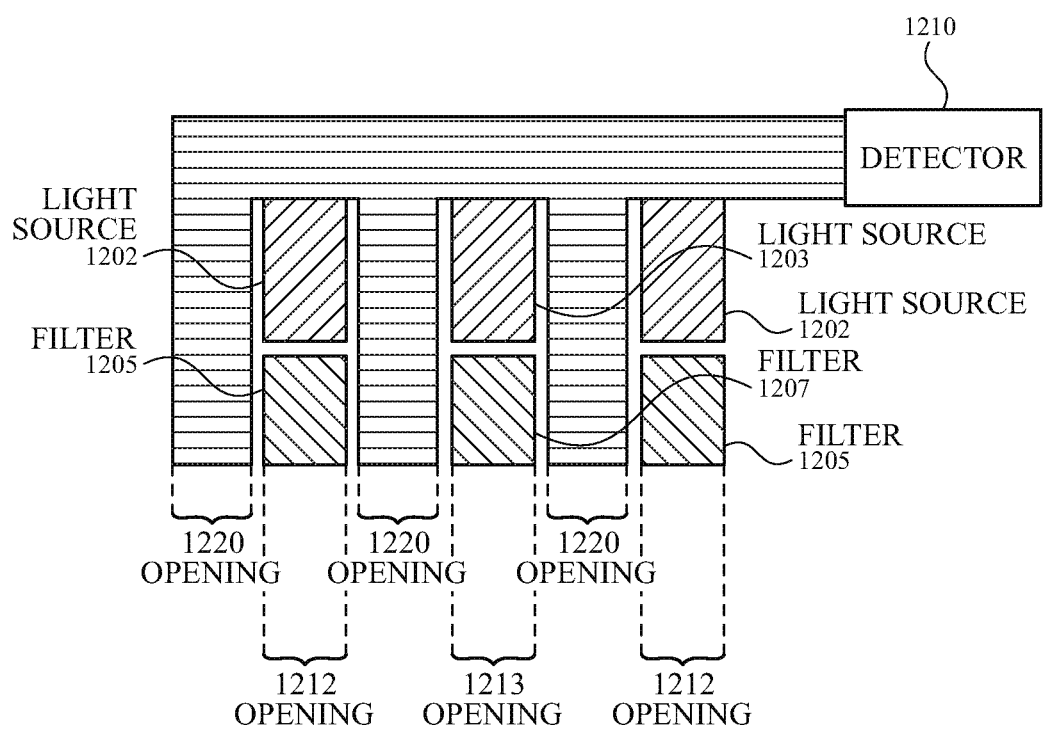

FIGS. 12A-12B illustrate top and cross-sectional views of an exemplary interleaved comb spectrometer according to examples of the disclosure. Interface 1201 can include a plurality of light source openings, such as openings 1212 and openings 1213, coupled to one or more light sources (e.g., light source 1202 and light source 1203). Interface 1201 can further include a plurality of detector openings, such as openings 1220 coupled to one or more detectors (e.g., detector 1210). In some examples, light source openings can be interleaved with detector openings. For example, interface 1201 can be arranged as rows of openings, as illustrated in FIG. 12A. A row can alternate between a light source opening and detector opening. In some examples, opening 1212 can be coupled to a different light source (e.g., light source 1202) (or a light source having different optical properties) than opening 1213. In some examples, light source 1202 and light source 1203 can have the same optical properties, but can be coupled to filters having different optical properties. For example, light source 1202 can be coupled to filter 1205, and light source 1203 can be coupled to filter 1207. Filter 1205 can allow one or more different wavelength bands (e.g., wavelength band 339 illustrated in FIG. 3C) to pass through than filter 1207 can allow (e.g., filter 1207 can allow wavelength band 337 illustrated in FIG. 3C to pass through). In some examples, at least two rows can have the same pattern of openings. In some examples, at least two rows can have different patterns of openings (e.g., a first row can have a pattern including opening 1212, opening 1220, opening 1213, opening 1220, opening 1212, opening 1220, and opening 1213; and a second row can have a pattern including opening 1212, opening 1220, opening 1213, opening 1220, opening 1213, opening 1220, and opening 1220).

A spectrometer is disclosed. In some examples, the spectrometer comprises: a plurality of light emitters configured to emit a plurality of wavelengths of light across a spectrum, each light emitter configured to emit light in one or more wavelength bands included in the plurality of wavelengths, each of the one or more wavelength bands being separated from another wavelength band by one or more wavelengths, wherein at least two of the one or more wavelength bands of at least two of the plurality of light emitters include different wavelengths; and one or more detectors configured to detect a reflection of light emitted by the plurality of light emitters and configured to generate one or more signals indicative of the reflection of light. Additionally or alternatively, in some examples, the spectrometer further comprises: a plurality of sets of first openings, each set coupled to one of the plurality of light emitters, wherein each set comprises light emitters having different optical properties. Additionally or alternatively, in some examples, the spectrometer further comprises: one or more second openings coupled to the one or more detectors, wherein the plurality of sets of first openings forms a ring and the one or more second openings are located in a center of the ring. Additionally or alternatively, in some examples, the spectrometer further comprises: one or more first openings, each first opening coupled to one of the plurality of light emitters, one or more second openings, each second opening coupled to the one or more detectors, wherein the one or more first openings and the one or more second openings are interleaved. Additionally or alternatively, in some examples, the one or more first openings and the one or more second openings alternate. Additionally or alternatively, in some examples, the one or more wavelength bands of adjacent light emitters include a same wavelength. Additionally or alternatively, in some examples, the spectrometer further comprises: a plurality of openings configured to allow light to pass through; and a waveguide configured to optically couple at least one of the plurality of light emitters to at least one of the plurality of openings. Additionally or alternatively, in some examples, the waveguide is an optical fiber. Additionally or alternatively, in some examples, the waveguide is a silicon photonics chip. Additionally or alternatively, in some examples, the waveguide is coupled to at least two of the plurality of light emitters. Additionally or alternatively, in some examples, the spectrometer further comprises: a plurality of waveguides including the waveguide, wherein the waveguide coupled to one of the plurality of light emitters. Additionally or alternatively, in some examples, the spectrometer is capable of measuring multiple wavelengths at a same time. Additionally or alternatively, in some examples, the spectrometer is capable of measuring multiple wavelengths without spatial movement. Additionally or alternatively, in some examples, the spectrometer excludes a filter. Additionally or alternatively, in some examples, a number of the one or more wavelength bands is equal to a number of the plurality of light emitters multiplied by a number of the one or more detectors, the spectrometer further comprising: one or more filters optically coupled to the one or more detectors, wherein a number of the one or more filters is equal to the number of the one or more detectors. Additionally or alternatively, in some examples, at least one of the one or more detectors is configured to detect a reflection of at least two of the plurality of light emitters. Additionally or alternatively, in some examples, a separation distance between each light emitter and an optically coupled detector is the same. Additionally or alternatively, in some examples, the spectrometer further comprises: a processor capable of: receiving the one or more signals from the one or more detectors, determining one or more properties of a sample using a portion of the one or more signals included in the one or more wavelength bands.

A light source is disclosed. In some examples, the light source comprises: a plurality of light emitters configured to emit a plurality of wavelengths of light across a spectrum, each light emitter configured to emit light in one or more wavelength bands included in the plurality of wavelengths, each of the one or more wavelength bands being separated from another wavelength band by one or more wavelengths, wherein at least two of the one or more wavelength bands of at least two of the plurality of light emitters include different wavelengths. Additionally or alternatively, in some examples, the plurality of light emitters includes a first light emitter and a second light emitter, the first light emitter including at least one wavelength band shifted relative to at least one wavelength band of the second light emitter. Additionally or alternatively, in some examples, each of the plurality of light emitters includes a plurality of quantum dots, each quantum dot configured to emit light included in one wavelength band, separate and distinct from the wavelength bands of the other of the plurality of quantum dots. Additionally or alternatively, in some examples, each of the plurality of quantum dots has a size different from the other of the plurality of quantum dots, the size associated with the one wavelength band. Additionally or alternatively, in some examples, each of the plurality of light emitters includes a plurality of layers, each of the plurality of layers including one or more of the plurality of quantum dots having a same size. Additionally or alternatively, in some examples, the plurality of quantum dots is located in a single layer. Additionally or alternatively, in some examples, each of the plurality of light emitters includes a plurality of layers, at least one of the plurality of layers including at least two of the plurality of quantum dots having different sizes. Additionally or alternatively, in some examples, the one or more wavelength bands have bandpass less than or equal to 10 nm. Additionally or alternatively, in some examples, the one or more wavelength bands are separated by at least 15 nm.

A method for emitting light across a spectrum is disclosed. In some examples, the method comprises: activating one or more first light emitters, wherein each of the first light emitters emits light included in one or more first wavelength bands, each of the one or more first wavelength bands separated from another first wavelength band by one or more wavelengths; and activating one or more second light emitters, wherein each of the second light emitters emits light included in one or more second wavelength bands, each of the one or more second wavelength bands separated from another second wavelength band by one or more wavelengths, wherein the one or more second wavelength bands are shifted relative to the one or more first wavelength bands, and further wherein the one or more first light emitters and the one or more second light emitters are activated at different times.

A method for determining one or more properties of a sample is disclosed. In some examples, the method comprises: activating a plurality of first light emitters, wherein each of the first light emitters emits light included in one or more first wavelength bands, each of the one or more first wavelength bands separated from another first wavelength band by one or more wavelengths; and activating a plurality of second light emitters, wherein each of the second light emitters emits light included in one or more second wavelength bands, each of the one or more second wavelength bands separated from another second wavelength band by one or more wavelengths, wherein the one or more second wavelength bands are shifted relative to the one or more first wavelength bands, and further wherein the plurality of first light emitters and the plurality of second light emitters are activated at different times; the method further comprises detecting a reflection of first light emitted by the plurality of first light emitters; generating a first signal indicative of the detected reflection of the first light; detecting a reflection of second light emitted by the plurality of second light emitters; generating a second signal indicative of the detected reflection of the second light; and determining the one or more sample properties based on at least the first and second signals. Additionally or alternatively, in some examples, the method further comprises: excluding portions of the first signal not associated with the one or more first wavelength bands; and excluding portions of the second signal not associated with the one or more second wavelength bands. Additionally or alternatively, in some examples, each of the plurality of first light emitters are spatially separated and activated at a same time, and each of the plurality of second light emitters are spatially separated and activated at a same time. Additionally or alternatively, in some examples, the method further comprises: mixing one or more of the reflection of the first light and the reflection of the second light using a waveguide. Additionally or alternatively, in some examples, the method further comprises: mixing one or more of the reflection of the first light and the reflection of the second light using the sample. Additionally or alternatively, in some examples, the method further comprises: determining a difference in signal values between at least one of the plurality of first light emitters and at least one of the second light emitters, wherein the signal values are associated with a same wavelength included in both the one or more first wavelength bands and the one or more second wavelength bands. Additionally or alternatively, in some examples, the method further comprises: filtering one or more of the emitted first light to the one or more first wavelength bands by activating the plurality of first light emitters; and filtering the detected reflection of the first light to one or more third wavelength bands using one or more filters, wherein the one or more first wavelength bands are included in the one or more third wavelength bands.

A filter is disclosed. In some examples, the filter comprises: a plurality of sets of quantum dots, each set of quantum dots configured to emit light included in one wavelength band, separate and distinct from the wavelength bands of the other sets of quantum dots, wherein the plurality of sets of quantum dots can be located on the same layer and each set of quantum dots can be located in separate sections of the layer. Additionally or alternatively, in some examples, at least two sets of quantum dots are configured to form a step filter, a wavelength of a step for one step filter located at a different wavelength than the wavelength of a step for the other step filter.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A spectrometer comprising:
a plurality of light emitters configured to emit a plurality of wavelengths of light across a spectrum, each light emitter configured to emit light in a plurality of wavelength bands, each of the plurality of wavelength bands separated from each of the other of the plurality of wavelength bands by a noise band comprising one or more wavelengths, wherein at least two of the plurality of light emitters include different wavelengths bands; and
one or more detectors configured to detect a reflection of light emitted by the plurality of light emitters and configured to generate one or more signals indicative of the reflection of light.

2. The spectrometer of claim 1, further comprising:
a plurality of sets of first openings, each set coupled to one of the plurality of light emitters, wherein each set comprises light emitters having different optical properties; and
one or more second openings coupled to the one or more detectors, wherein the plurality of sets of first openings forms a ring and the one or more second openings are located in a center of the ring.

3. The spectrometer of claim 1, further comprising:
one or more first openings, each first opening coupled to one of the plurality of light emitters,
one or more second openings, each second opening coupled to the one or more detectors,
wherein the one or more first openings and the one or more second openings are interleaved.

4. The spectrometer of claim 3, wherein the one or more first openings and the one or more second openings alternate.

5. The spectrometer of claim 1, wherein the plurality of wavelength bands of adjacent light emitters include a same wavelength.

6. The spectrometer of claim 1, further comprising:
a plurality of openings configured to allow light to pass through; and
a waveguide configured to optically couple at least one of the plurality of light emitters to at least one of the plurality of openings.

7. The spectrometer of claim 6, wherein the waveguide is one or more of an optical fiber and a silicon photonics chip.

8. The spectrometer of claim 6, wherein the waveguide is coupled to at least two of the plurality of light emitters.

9. The spectrometer of claim 6, wherein the waveguide comprises a plurality of waveguides, and wherein the waveguide is coupled to one of the plurality of light emitters.

10. The spectrometer of claim 1, wherein the spectrometer is capable of measuring multiple wavelengths at a same time.

11. The spectrometer of claim 1, wherein the spectrometer is capable of measuring multiple wavelengths without spatial movement.

12. The spectrometer of claim 1, wherein the spectrometer excludes a filter.

13. The spectrometer of claim 1, wherein a number of the plurality of wavelength bands is equal to a number of the plurality of light emitters multiplied by a number of the one or more detectors, the spectrometer further comprising:
one or more filters optically coupled to the one or more detectors, wherein a number of the one or more filters is equal to the number of the one or more detectors.

14. The spectrometer of claim 1, wherein a separation distance between each light emitter and an optically coupled detector is the same.

15. The spectrometer of claim 1, wherein at least one of the one or more detectors is configured to detect a reflection of at least two of the plurality of light emitters.

16. The spectrometer of claim 1, further comprising:
a processor capable of:
receiving the one or more signals from the one or more detectors,
determining one or more properties of a sample using a portion of the one or more signals.

17. The spectrometer of claim 1, wherein at least one of the plurality of light emitters includes a plurality of quantum dots, each quantum dot configured to emit light included in one wavelength band, separate and distinct from the wavelength bands of the other of the plurality of quantum dots.

18. The spectrometer of claim 17, wherein each of the plurality of quantum dots has a size different from the other of the plurality of quantum dots, the size associated with the one wavelength.

19. The spectrometer of claim 18, wherein the at least one of the plurality of light emitters includes a plurality of layers, each of the plurality of layers including one or more of the plurality of quantum dots having a same size.

* * * * *